US011963476B2

(12) United States Patent
Dick

(10) Patent No.: US 11,963,476 B2
(45) Date of Patent: Apr. 23, 2024

(54) SECTIONAL CONTROL FUNNEL BOX

(71) Applicant: Intelligent Agricultural Solutions LLC, Fargo, ND (US)

(72) Inventor: Wyatt Dick, Fargo, ND (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 882 days.

(21) Appl. No.: 16/981,143

(22) PCT Filed: Feb. 6, 2019

(86) PCT No.: PCT/US2019/016909
§ 371 (c)(1),
(2) Date: Sep. 15, 2020

(87) PCT Pub. No.: WO2019/177715
PCT Pub. Date: Sep. 19, 2019

(65) Prior Publication Data
US 2021/0112701 A1    Apr. 22, 2021

Related U.S. Application Data

(60) Provisional application No. 62/644,012, filed on Mar. 16, 2018.

(51) Int. Cl.
*A01C 7/08* (2006.01)
*A01C 15/04* (2006.01)
(Continued)

(52) U.S. Cl.
CPC .............. *A01C 7/088* (2013.01); *A01C 15/04* (2013.01); *A01C 15/06* (2013.01); *A01C 21/005* (2013.01)

(58) Field of Classification Search
CPC ......... A01C 15/04; A01C 15/06; A01C 7/088; A01C 21/005; A01M 9/0076; A01M 9/0092
(Continued)

(56) References Cited

U.S. PATENT DOCUMENTS 5,052,627 A   10/1991  Balmer
5,950,933 A    9/1999  Balmer
(Continued)

FOREIGN PATENT DOCUMENTS

EP          2269434 A1      1/2011

OTHER PUBLICATIONS

International Preliminary Report on Patentability for PCT Application No. PCT/US2019/016907, dated Aug. 11, 2020, pp. 10.
(Continued)

*Primary Examiner* — Cody J Lieuwen

(57) ABSTRACT

A sectional control funnel box (36) includes a box body having an upper receiving member (44) for receiving particulate matter, a lower manifold (46) configured to be mounted on a distribution plate (24), and a funnel mechanism (42) disposed between the upper receiving member and the lower manifold. The lower manifold includes a plurality of chutes (100) configured to direct the particulate matter to apertures (38) in the distribution plate. The funnel mechanism includes supply sections (54, 76) that include directing slots (56, 90) configured to provide the particulate matter from the upper receiving member to the chutes. An actuator (48) is attached to the funnel mechanism (42) and configured to drive the funnel mechanism between at least a first position, where a first one of the plurality of supply sections is aligned with the upper receiving member (44), and a second position, where a second one of the plurality of supply sections is aligned with the upper receiving member.

19 Claims, 23 Drawing Sheets

(51) Int. Cl.
*A01C 15/06* (2006.01)
*A01C 21/00* (2006.01)

(58) Field of Classification Search
USPC .......................................... 239/671, 673, 676
See application file for complete search history.

(56) References Cited

U.S. PATENT DOCUMENTS

| | | |
|---|---|---|
| 2009/0079624 A1 | 3/2009 | Dean et al. |
| 2015/0223391 A1* | 8/2015 | Wendte .................. A01C 7/04 |
| | | 111/177 |
| 2018/0002112 A1 | 1/2018 | Zimmerman |
| 2018/0042172 A1* | 2/2018 | Gervais ................ A01C 21/005 |
| 2019/0223371 A1* | 7/2019 | Altepeter ............... A01C 15/12 |

OTHER PUBLICATIONS

International Preliminary Report on Patentability for PCT Application No. PCT/US2019/016909, dated Sep. 22, 2020, pp. 9.
International Search Report and Written Opinion for PCT Application No. PCT/US2019/016907, dated May 15, 2019, pp. 15.
International Search Report and Written Opinion for PCT Application No. PCT/US2019/016909, dated May 15, 2019, pp. 15.

* cited by examiner

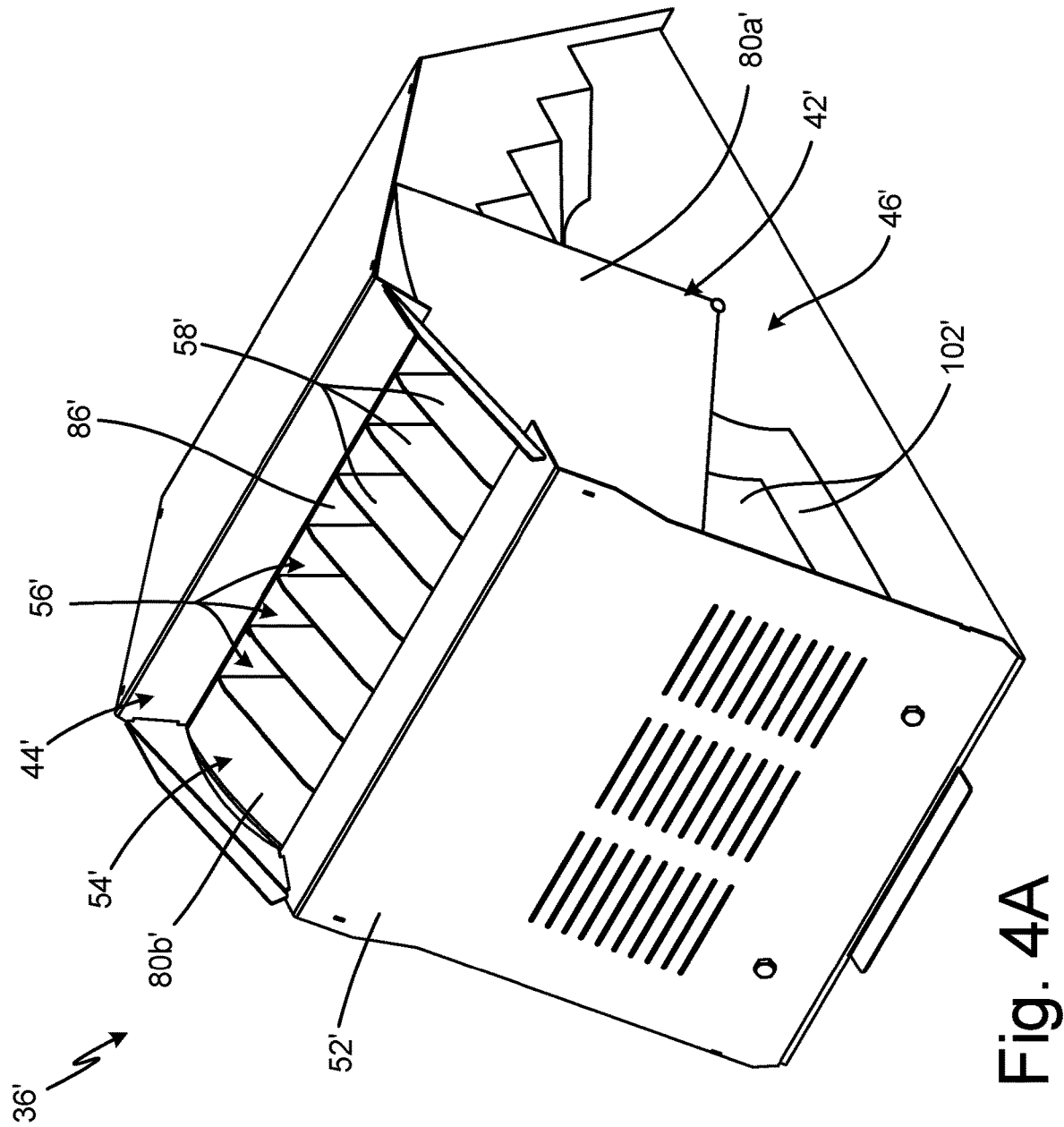

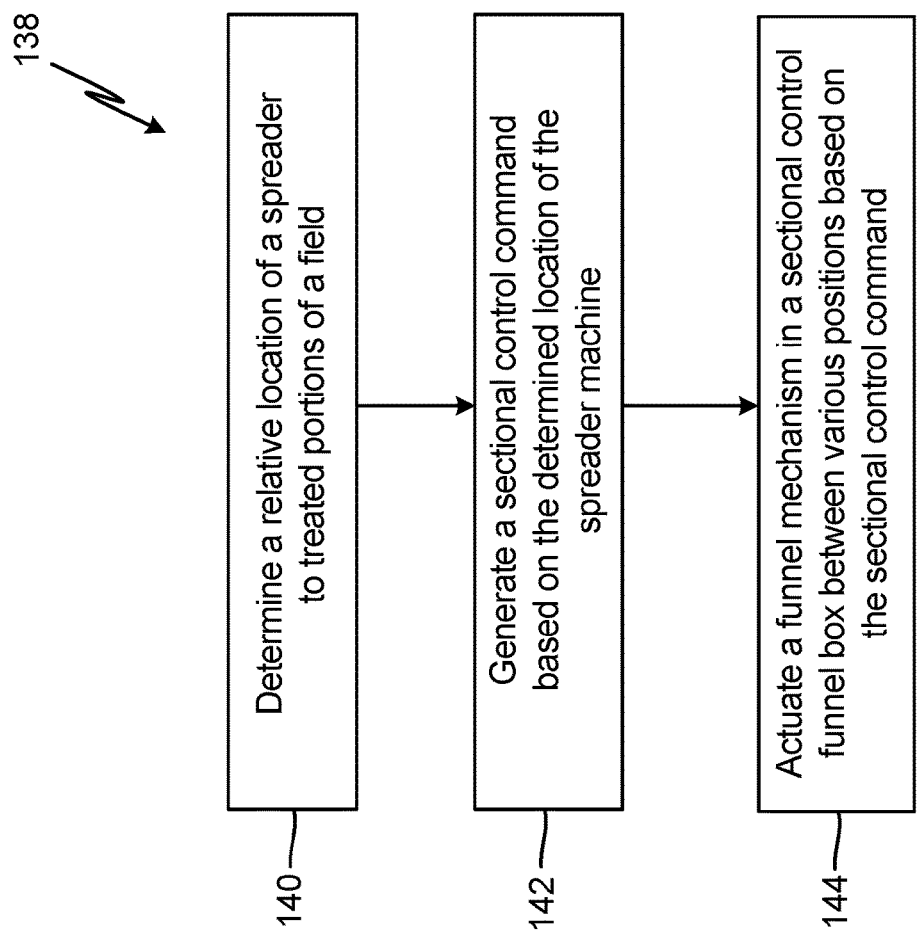

SECTIONAL CONTROL FUNNEL BOX

CROSS-REFERENCE TO RELATED APPLICATION

This application claims priority to U.S. Provisional Application No. 62/644,012 filed Mar. 16, 2018, and entitled "SECTIONAL CONTROL FUNNEL BOX," the disclosure of which is hereby incorporated in its entirety.

BACKGROUND

This disclosure relates generally to sectional control for agricultural spreaders. More specifically, this disclosure relates to sectional control funnel boxes for use during product application by an agricultural spreader.

Agricultural spreader machines are available in different configurations, including self-propelled (referred to as a "floater"), pull-type, and 3-point hitch mounted configurations. Agricultural spreaders are used to spread various particulate materials, such as fertilizer, onto fields. While fertilizer spreaders are discussed herein as an exemplar, it is understood that fertilizer is merely one example and that various other granular materials, such as seed, pellets, etc., can be applied. Fertilizers and plant nutrients are incorporated into dry particulate granules for application in soil. The particulate material is loaded into product tanks located on the fertilizer spreader machine. Some fertilizer spreader machines are equipped with at least two separate product tanks, e.g., a primary tank and a secondary tank, to allow the provision of fertilizer blends by dispensing and mixing particulate matter from each tank. As such, the operator can create a desired blend by controlling the ratio supplied from each tank.

To convey the particulate material from each tank, the fertilizer spreader machine utilizes a conveyor belt driven by a pulley and sprocket system. Each product bin typically includes two conveyor belts, with each conveyor belt providing material for distribution on one side of the boom mechanism. The conveyor belts are mounted in parallel. The particulate material is drawn out of the tank onto the conveyor belt. The belt conveys the material and drops the material into a funnel box, which feeds the particulate material to tubes extending laterally away from the machine along the booms of a boom mechanism. A central fan is situated between the left and right sides of the boom mechanism. The fan aids in movement of product into the funnel box and through the tubes extending along the boom mechanism. Each funnel box includes a plurality of dispense points that feed the particulate material to the associated boom and support an even flow of product to each portion of the boom mechanism. As the product falls through the dispense points, the product is entrained in the airflow generated by the fan and is conveyed down the tubes along the boom until the particulate is directed onto the soil by a deflector plate.

Due to asymmetrical field features and the typical working width of fertilizer spreaders, the boom mechanisms of the fertilizer spreader will at times overlap a part of the field on which particulate has already been applied. Overlap and duplicative application due to not being able to control flow to separate boom sections from the product tanks is inefficient and wasteful. Currently, the operator is only able to shut off the feed belt, effectively shutting off the flow of material to one lateral half of the machine. The inability to more closely refine control during product application can cause product waste and reduce yield, due to inefficient application and over-application of product.

SUMMARY

According to one aspect of the disclosure, a sectional control funnel box includes a manifold including a plurality of chutes extending through the manifold; a funnel mechanism movable relative to the manifold, the funnel mechanism including a plurality of supply sections configured to direct material from an upper receiving opening to select ones of the plurality of chutes; and an actuator connected to the funnel mechanism and configured to drive the funnel mechanism between a first position, where a first one of the plurality of supply sections is aligned with the upper receiving opening, and a second position, where a second one of the plurality of supply sections is aligned with the upper receiving opening.

According to another aspect of the disclosure, a sectional control system includes a product bin disposed on an agricultural spreader and configured to store particulate material; a boom extending laterally from the agricultural spreader; a first dispensing line and a second dispensing line extending along the boom, the first dispensing line providing the particulate material to a first dispensing point and the second dispensing line providing the particulate material to a second dispensing point; a conveyor configured to draw material from the product bin; and a sectional control funnel box mounted to receive the material from the conveyor. The sectional control funnel box includes an upper receiving opening positioned to receive the material from the conveyor; a manifold disposed below the upper receiving opening and including a plurality of chutes extending through the manifold; a funnel mechanism disposed between the upper receiving opening and the manifold, wherein the funnel mechanism is movable relative to the manifold, and the funnel mechanism includes a plurality of supply sections configured to direct material from the upper receiving opening to select ones of the plurality of chutes; and an actuator connected to the funnel mechanism and configured to drive the funnel mechanism between a first position, where a first one of the plurality of supply sections is aligned with the upper receiving opening, and a second position, where a second one of the plurality of supply sections is aligned with the upper receiving opening.

According to yet another aspect of the disclosure, a method includes determining a location of a spreader machine in a field relative to treated portions of the field; generating a section control command based on the determined location of the spreader machine and providing the section control command to an actuator of a sectional control funnel box of the spreader machine; driving, by the actuator, a funnel mechanism of the sectional control funnel box to a desired position based on the section control command; and directing, by the funnel mechanism, the material to select dispense lines extending laterally from the spreader machine along a boom of the spreader machine.

BRIEF DESCRIPTION OF THE DRAWINGS

FIG. 4A is an isometric view of another sectional control funnel box.

FIG. 7 is a flow chart showing a method for controlling particulate distribution.

DETAILED DESCRIPTION

Figure 1A:
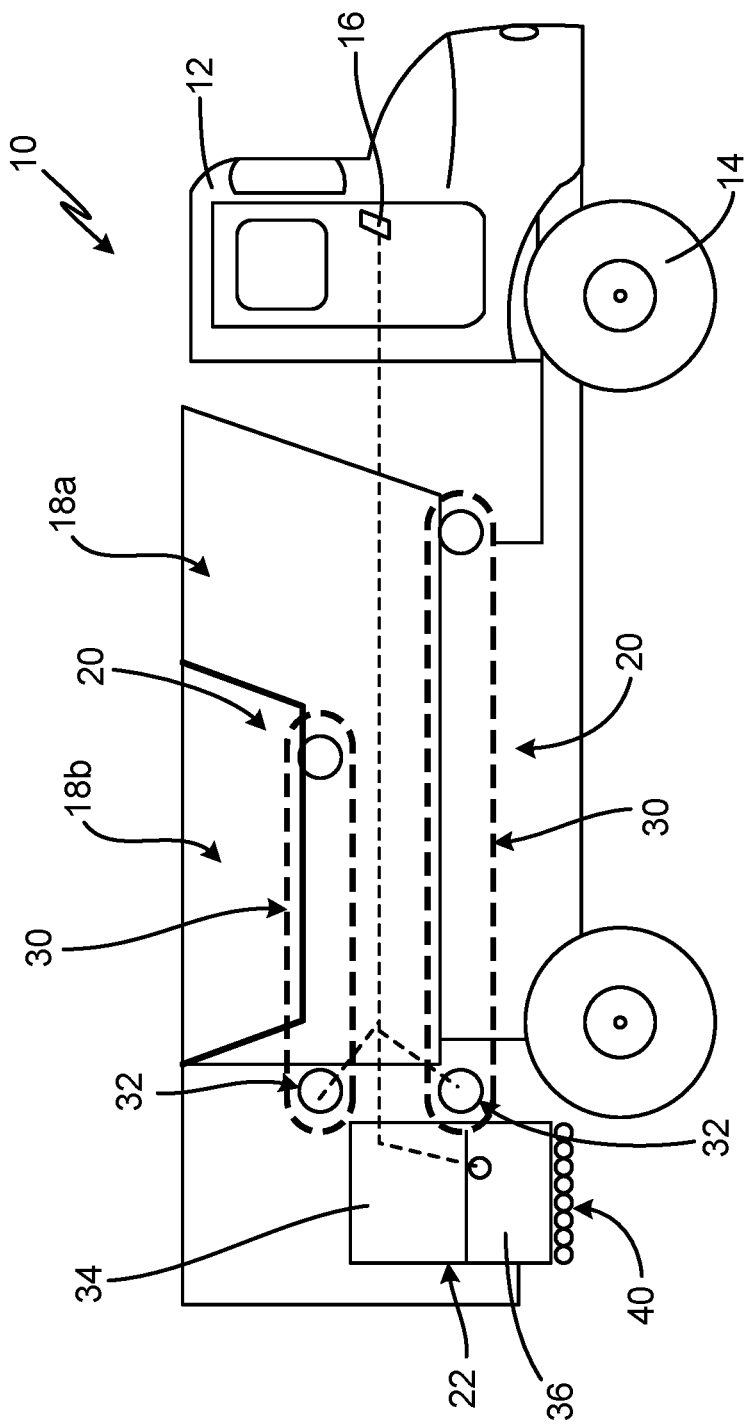
FIG. 1A is a side schematic view of a floater.
Figure 1B:
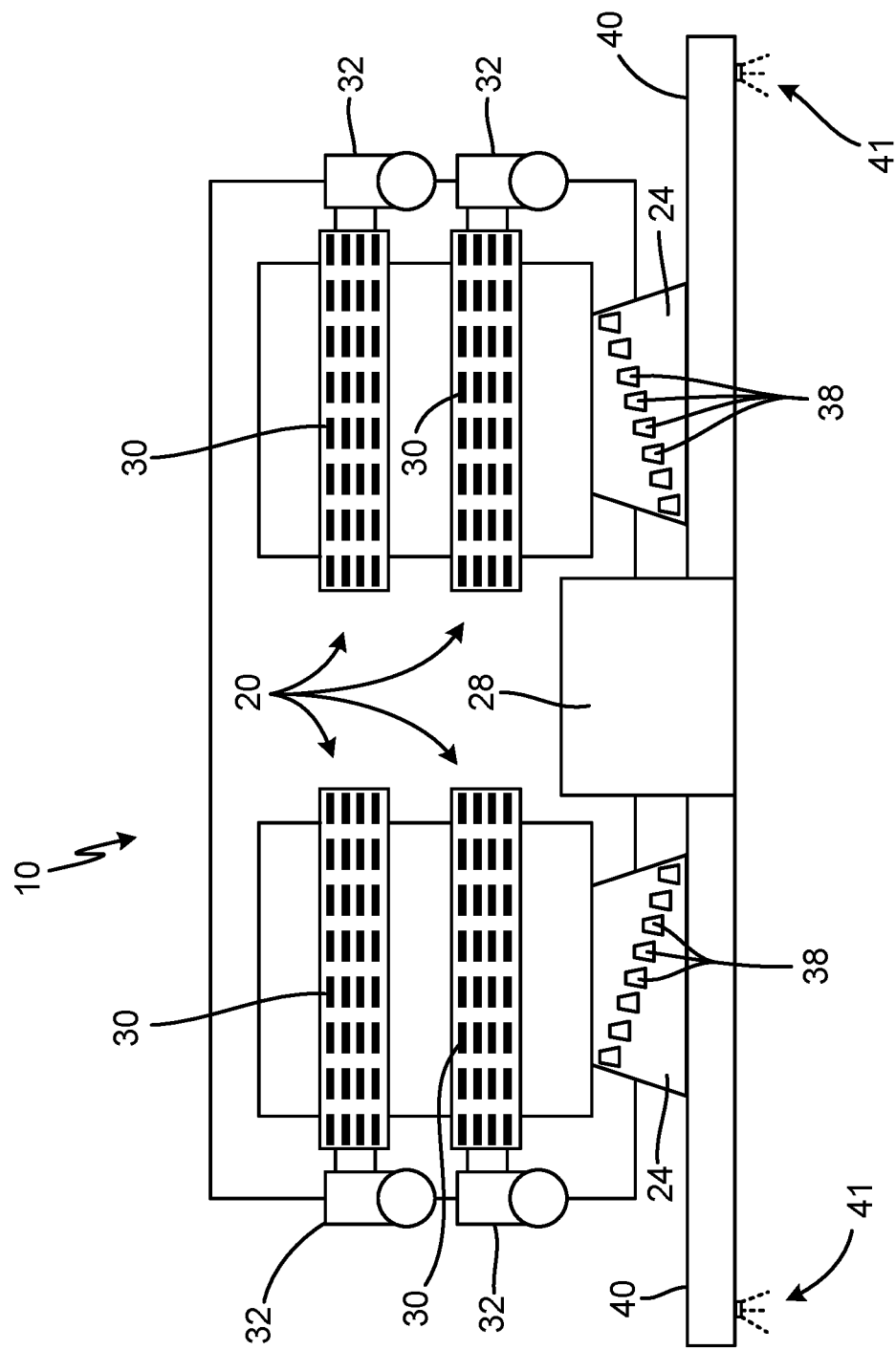
FIG. 1B is a rear schematic view of a floater.
Figure 1C:
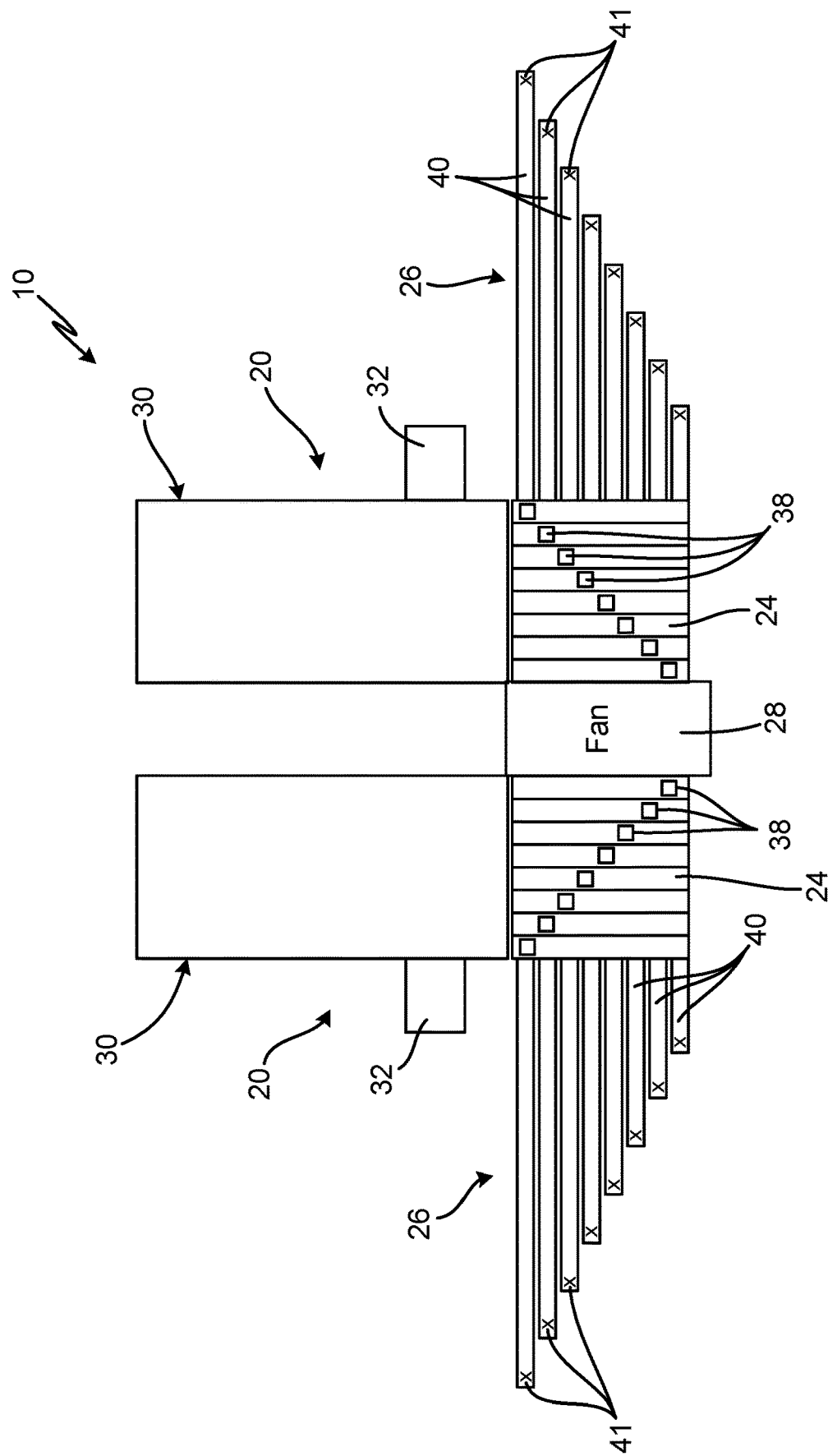
FIG. 1C is a top schematic view of a floater.
Figure 1D:
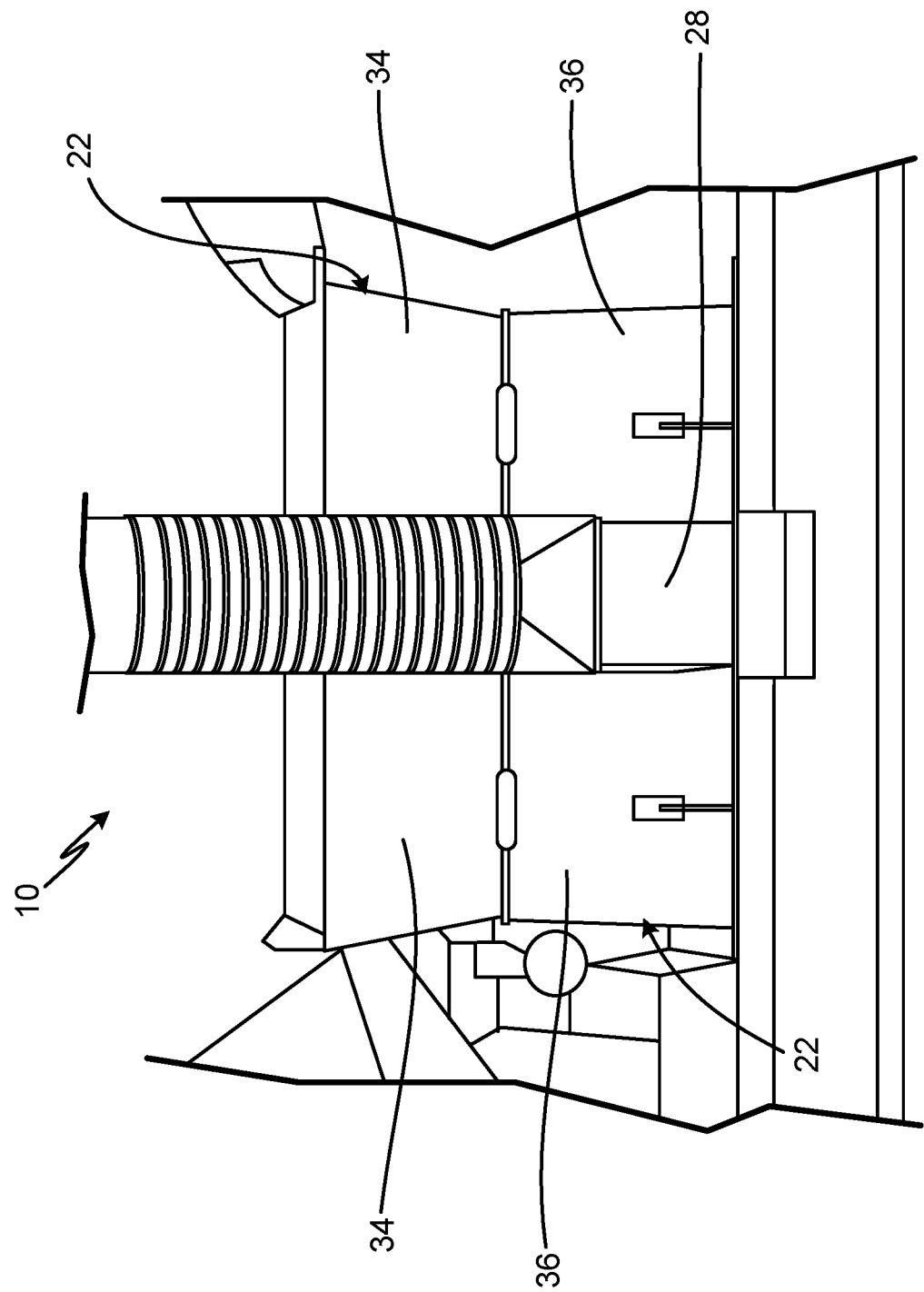
FIG. 1D is a rear elevation view of a floater.

FIG. 1A is a side schematic view of floater 10. FIG. 1B is a rear schematic view of floater 10. FIG. 1C is a top schematic view of floater 10. FIG. 1D is a rear elevation view of a floater. FIGS. 1A-1D will be discussed together. Floater 10 includes cab 12, wheels 14, system controller 16, primary product bin 18 a, secondary product bin 18 b, bin conveyors 20, funnel box assemblies 22, distribution plates 24, booms 26, and fan 28. Conveyors 20 each include belt 30 and drivetrain 32. Each funnel box assembly 22 includes upper funnel box 34 and sectional control funnel box 36. Each distribution plate 24 includes a plurality of apertures 38. Each boom 26 includes a plurality of distribution lines 40, and each distribution line includes a dispense point 41. While floater 10 is shown as including primary product bin 18 a and secondary product bin 18 b, it is understood that floater 10 can include one product bin or more than two product bins to provide as many product bins as desired for a particular application. Floater 10 includes a first side and a second side. The first and second sides are preferably mirror-images of each other. As such, a single side will be discussed in detail.

Primary product bin 18a and secondary product bin 18b are configured to hold supplies of particulate material prior to application of the material in a field. The particulate material can be the same material in each of primary product bin 18a and secondary product bin 18b, or the particulate can vary between the bins. In some examples, the particulate material includes fertilizer or a blend of fertilizers, in other examples the particulate material includes seed. It is understood, however, that the particulate material can be any particulate material desired to be applied in a field.

Conveyors 20 extend parallel to each other through floater 10. Booms 26 extend laterally from floater 10 and receive the particulate material from primary product bin 18a and secondary product bin 18b. The conveyors 20 associated with primary product bin 18a draw particulate material from primary product bin 18a and provide the particulate material directly to sectional control funnel box 36. The conveyors 20 associated with secondary product bin 18b draw particulate material from secondary product bin 18b and provide the particulate material to upper funnel box 34, which funnels the particulate material to sectional control funnel box 36.

Sectional control funnel box 36 is mounted on distribution plate 24 and includes a plurality of chutes extending through sectional control funnel box 36. The chutes guide the particulate material through sectional control funnel box 36 to distribution plate 24. Each chute is associated with one of the apertures 38 that extend through distribution plate 24. Each chute provides a flowpath for the particulate material to pass through sectional control funnel box 36 between conveyor and boom 26. Sectional control funnel box 36 is the lower funnel box in funnel box assembly 22. Sectional control funnel box 36 controls the flow of particulate material to each aperture 38 and/or subsets of apertures 38 and thus to dispense points 41 along boom 26.

Upper funnel box 34 is mounted on sectional control funnel box 36. In some examples, upper funnel box 34 does not include any internal dividers, but it is understood that upper funnel box 34 can include internal dividers such that upper funnel box 34 also includes chutes, similar to sectional control funnel box 36. Upper funnel box 34 guides the particulate material into sectional control funnel box 36.

Distribution lines 40 are tubes extending along booms 26 from apertures 38. Distribution lines 40 convey the particulate material to individual distribution points 41 along boom 26. The particulate exits distribution lines 40 at distribution points 41. Each distribution point can be an orifice or nozzle in distribution line 40 through which the particulate exits distribution line 40. Each distribution line 40 is associated with an individual aperture 38 through distribution plate 24, such that each distribution line 40 receives particulate material from a single associated aperture 38. As such, each distribution point 41 receives particulate material from a single aperture 38 through distribution plate 24.

Fan 28 is mounted on floater 10 and is configured to generate an airflow and provide the airflow to distribution lines 40. The airflow draws the particulate material into distribution lines 40 and drives the particulate material through distribution lines 40 to the dispense points. The airflow generated by fan 28 runs underneath the distribution plate through distribution lines 40, thereby creating a suction. The suction draws the particulate material through apertures 38 in distribution plate 24 and into distribution lines 40. The particulate is entrained in the airflow and conveyed though distribution lines 40 by the airflow. The particulate is carried to the dispense points, where the particulate material impinges on a plate that redirects the particulate to fall out of distribution line 40 and onto the soil.

For each conveyor 20, drivetrain 32 is connected to and drives belt 30. In some examples, conveyor 20 includes a sprocket that is driven by drivetrain 32, with belt 30 extending over and driven by the sprocket. Belt 30 can also extend over one or more idler sprockets. Drivetrain 32 can be of any suitable configuration for driving movement of belt 30. For example, drivetrain 32 can be a hydraulic motor, a pneumatic motor, or an electric motor. When the particulate material reaches the end of belt 30 the particulate material falls off of belt 30 and into funnel box assembly 22. Funnel box assembly 22 guides the particulate material to apertures 38 in distribution plate 24, and thus to distribution lines 40 extending along boom 26.

Each distribution line 40 includes a deflector (not shown) that the particulate material impinges on prior to exiting distribution line 40 at dispense point 41. The deflector directs the particulate material out of distribution line 40 and onto the soil. In one example, the particulate hitting the deflector triggers acoustic sensors attached to the outside of the deflectors. The acoustic sensors can communicate various parameters to the operator in cab 12 via system controller 16. For example, the sensors can indicate the quality of the lateral product distribution, indicate how much product has been distributed, and/or provide feedback for an open-loop or closed-loop system capable of controlling the product distribution. Other embodiments include a strain detecting sensor including, but not limited to, surface acoustic devices, piezoelectric strain sensors, BOTDR (Brillouin optical time-domain reflectometer) and other optical fiber strain sensors.

System controller 16 can implement sectional control utilizing sectional control boxes 36 to control which distribution lines 40 receive particulate material at any given time. System controller 16 can implement the sectional control based on the location of floater 10 and the dispense points on boom 26 relative to areas of the field on which the particulate material has already been applied. For example, system controller 16 can control the position of a funnel mechanism movably mounted in sectional control funnel box 36 based on location data received from a geo-positioning system. For example, system controller 16 can control sectional control funnel box 36 based on location data from GPS (Global Positioning System), GNSS (Global Navigation Satellite System), GPS/RTK (GPS/Real Time Kinematic), or equivalent systems.

Sectional control funnel box 36 is retrofittable onto a dry-granular fertilizer spreader. Sectional control funnel box 36 gives the operator the ability to control product distribution by activating individual close-off doors located above the machine boom entrance. The close-off doors and a variable speed auger can meter fertilizer and other particulate material in a manner whereby the flow of fertilizer can be stopped, or adjusted, for portions of the working width of the fertilizer spreader machine, thereby providing sectional control by distributing the desired proportion of material to the desired sections of boom 26.

Figure 2A:
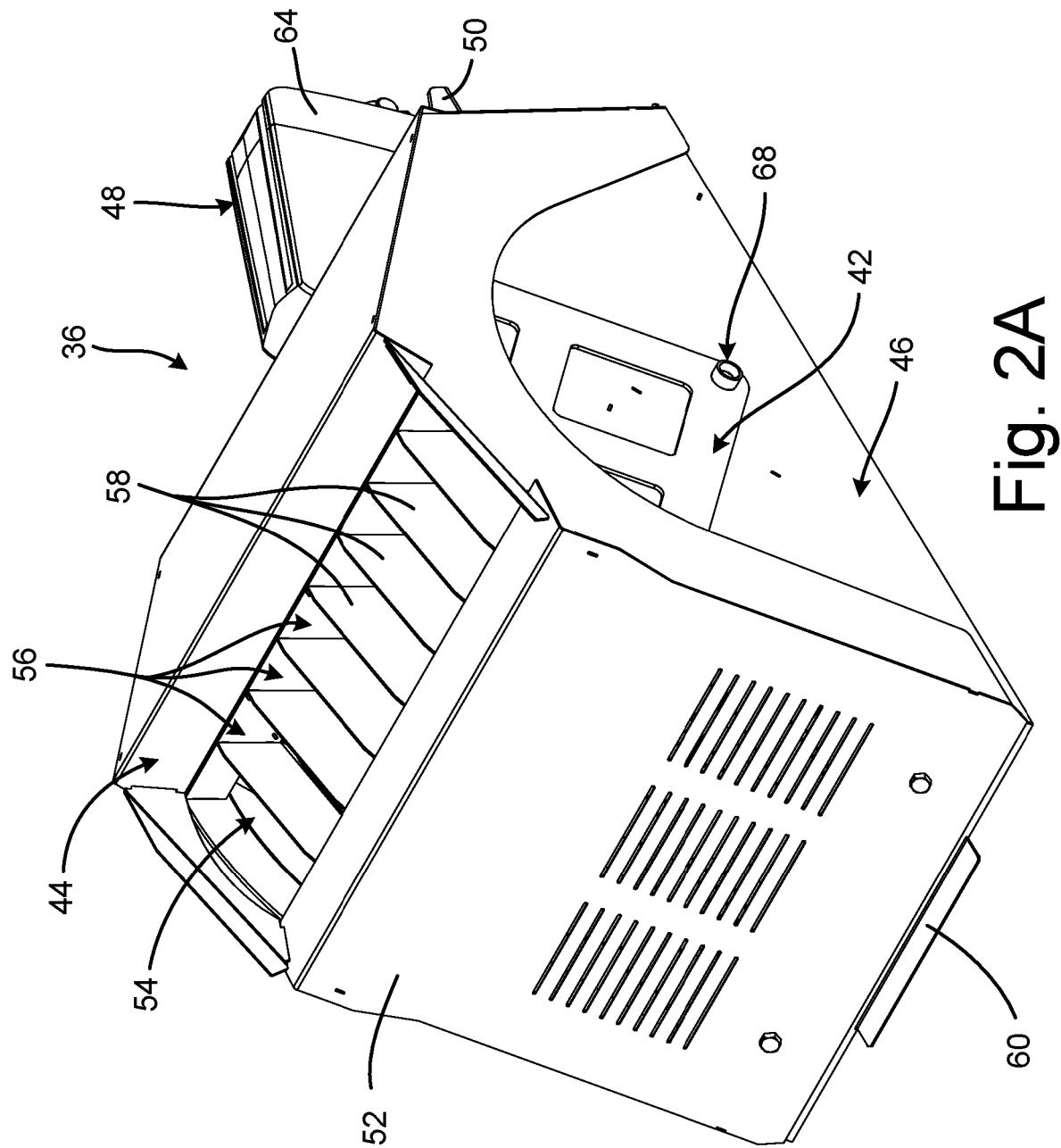
FIG. 2A is a first isometric view of a sectional control funnel box.
Figure 2B:
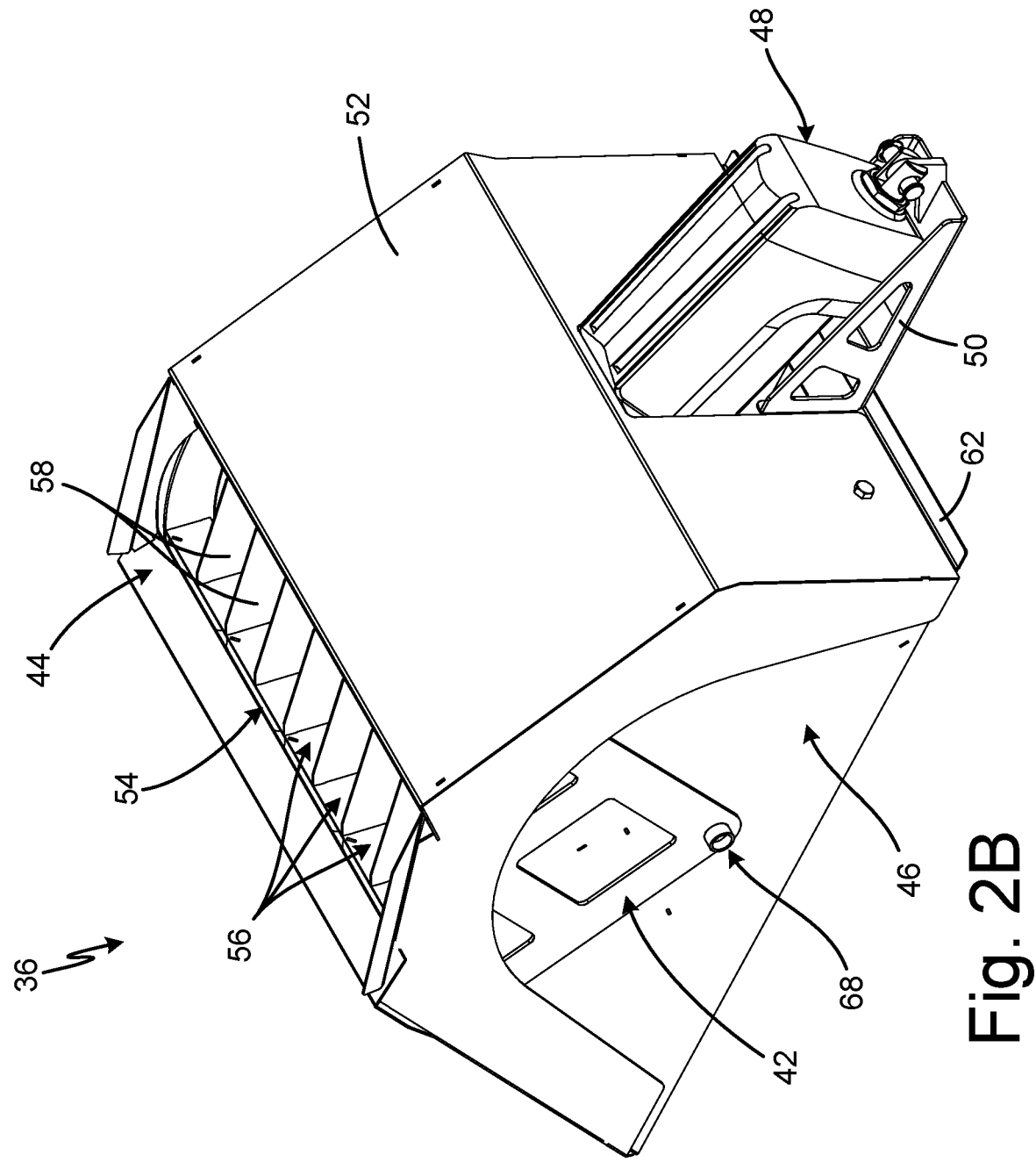
FIG. 2B is a second isometric view of a sectional control funnel box.

FIG. 2A is a first isometric view of sectional control funnel box 36. FIG. 2B is a second isometric view of sectional control funnel box 36. FIGS. 2A and 2B will be discussed together. Sectional control funnel box 36 includes a funnel mechanism 42, upper receiving portion 44, lower manifold 46, actuator 48, support plate 50, and cover 52. First supply section 54 of sectional control funnel box 36 is shown. First supply section 54 includes first slots 56, which are defined between first dividers 58. Front flange 60 and rear flange 62 of lower manifold 46 are shown.

Cover 52 extends over lower manifold 46 and funnel mechanism 42 and is mounted to lower manifold 46. Upper receiving portion 44 is an opening through cover 52 and includes sloped edges configured to guide particulate material to funnel mechanism 42. Lower manifold 46 is configured to mount directly to distribution plate 24 (best seen in FIGS. 5C-5E). Front flange 60 and rear flange 62 facilitate mounting of sectional control funnel box 36 on distribution plate 24. Front flange 60 and/or rear flange 62 can be secured to distribution plate by a clamp, such as an overcenter clamp, to secure sectional control funnel box 36 to distribution plate 24.

Funnel mechanism 42 is mounted on lower manifold 46 and disposed within sectional control funnel box 36 below receiving portion 44. Funnel mechanism 42 is mounted on lower manifold 46 at pivot point 68 (only one of which is shown). While funnel mechanism 42 is pivotably mounted on lower manifold 46, it is understood that funnel mechanism 42 can be mounted on lower manifold 46 in any desired manner. For example, funnel mechanism 42 can be mounted to shift linearly between the various positions.

Support plate 50 is mounted on lower manifold 46 and extends from lower manifold 46. Support plate 50 can be mounted on lower manifold 46 in any desired manner, either removably, such as by fasteners, or permanently, such as by welding. Actuator 48 is supported by support plate 50 and configured to actuate funnel mechanism 42 between the various positions. Actuator 48 can be of any suitable configuration for driving funnel mechanism 42 between the various positions. Actuator can include a hydraulic motor, a pneumatic motor, an electric motor, or any suitable motor for driving displacement of funnel mechanism 42. Actuator 48 can be of any suitable configuration for displacing funnel mechanism 42. For example, actuator 48 can include a screw and a rotary drive motor, or actuator 48 can include a piston and a linear drive motor.

As discussed in more detail below, funnel mechanism 42 is configured to shift between various positions to provide sectional control capabilities to floater 10 (FIGS. 1A-1D). Sectional control funnel box 36 provides on/off or adjustable control of the flow of particulate material from the product bins to dispense points 41 along boom 26. Sectional control funnel box 36 prevents over-application in areas of a field that floater 10 has already traversed. Preventing over-application saves material costs by eliminating waste of particulate material. Sectional control funnel box 36 can also be retrofit onto an existing floater 10 by removing the existing lower funnel box and installing sectional control funnel box 36. Sectional control funnel box 36 can be connected to the operating unit of floater 10, such as to system controller 16, to allow for autonomous control of actuator 48 and thus autonomous control of the position of funnel mechanism 42. Sectional control funnel box 36 provides low cost, easily installed sectional control capabilities to floaters not previously equipped with sectional control capabilities.

Figure 3A:
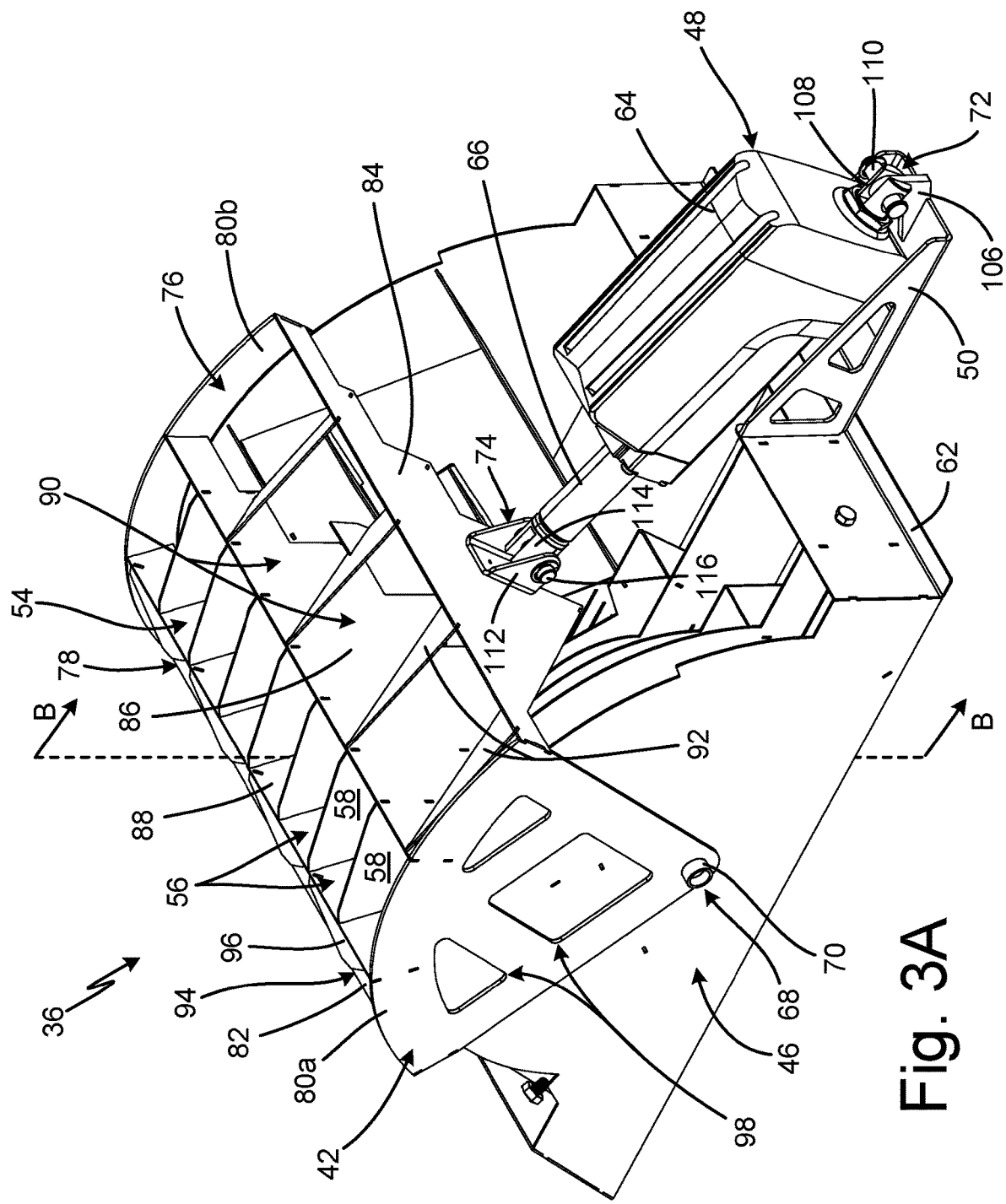
FIG. 3A is an isometric view of a sectional control funnel box with a funnel mechanism in a first position.
Figure 3B:
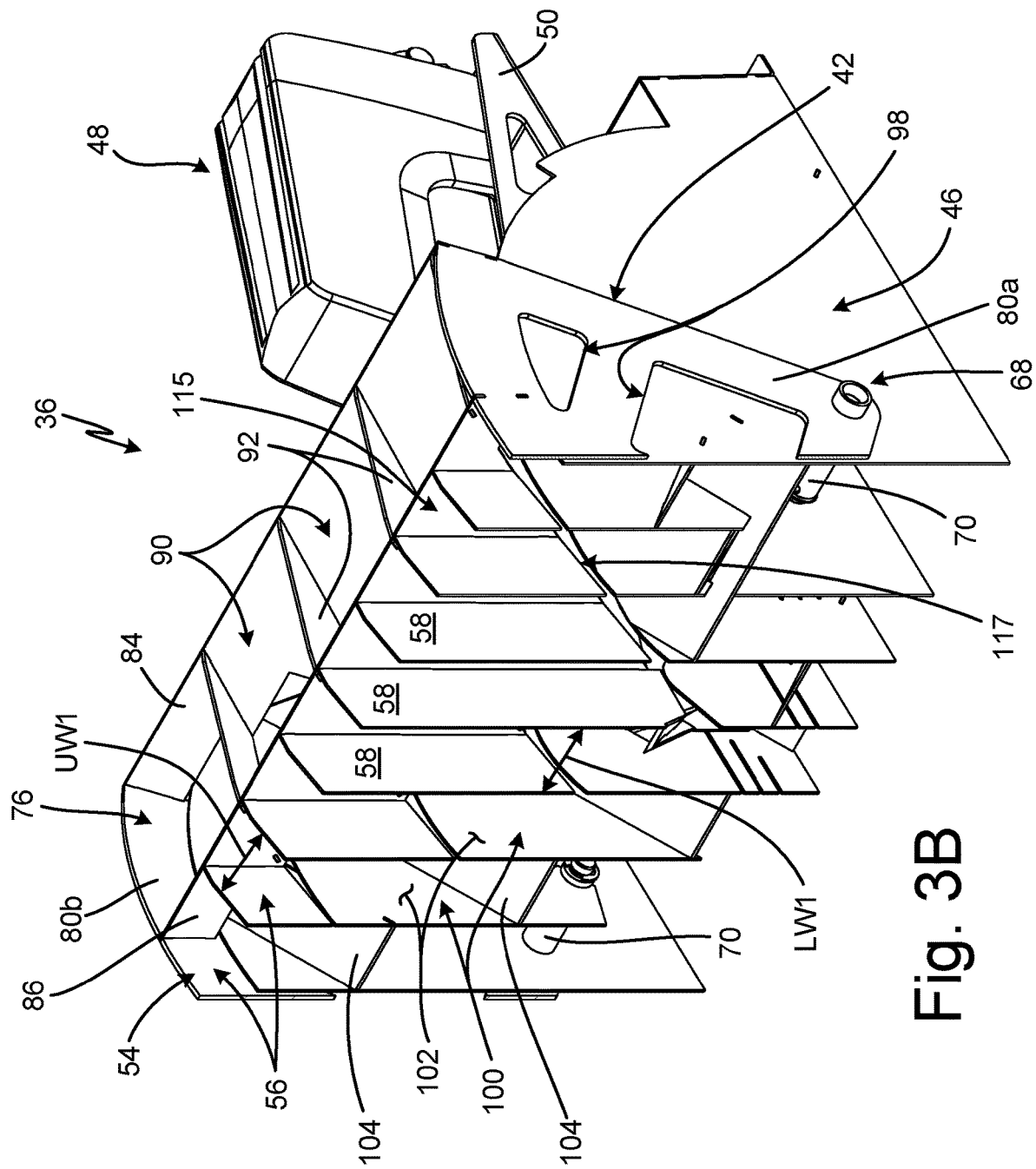
FIG. 3B is a cross-sectional view taken along line B-B in FIG. 3A.
Figure 3C:
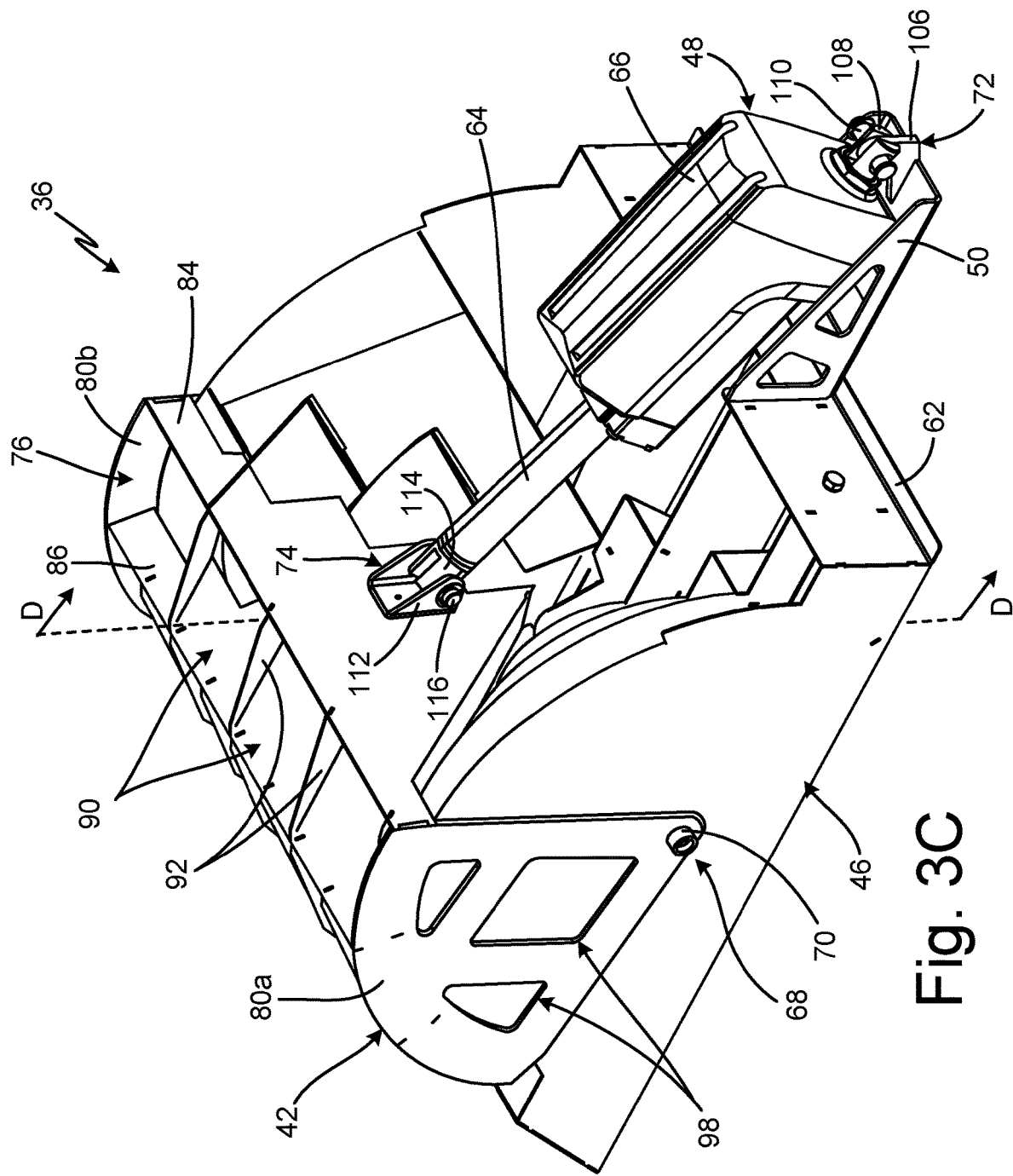
FIG. 3C is an isometric view of a sectional control funnel box with the funnel mechanism in a second position.
Figure 3D:
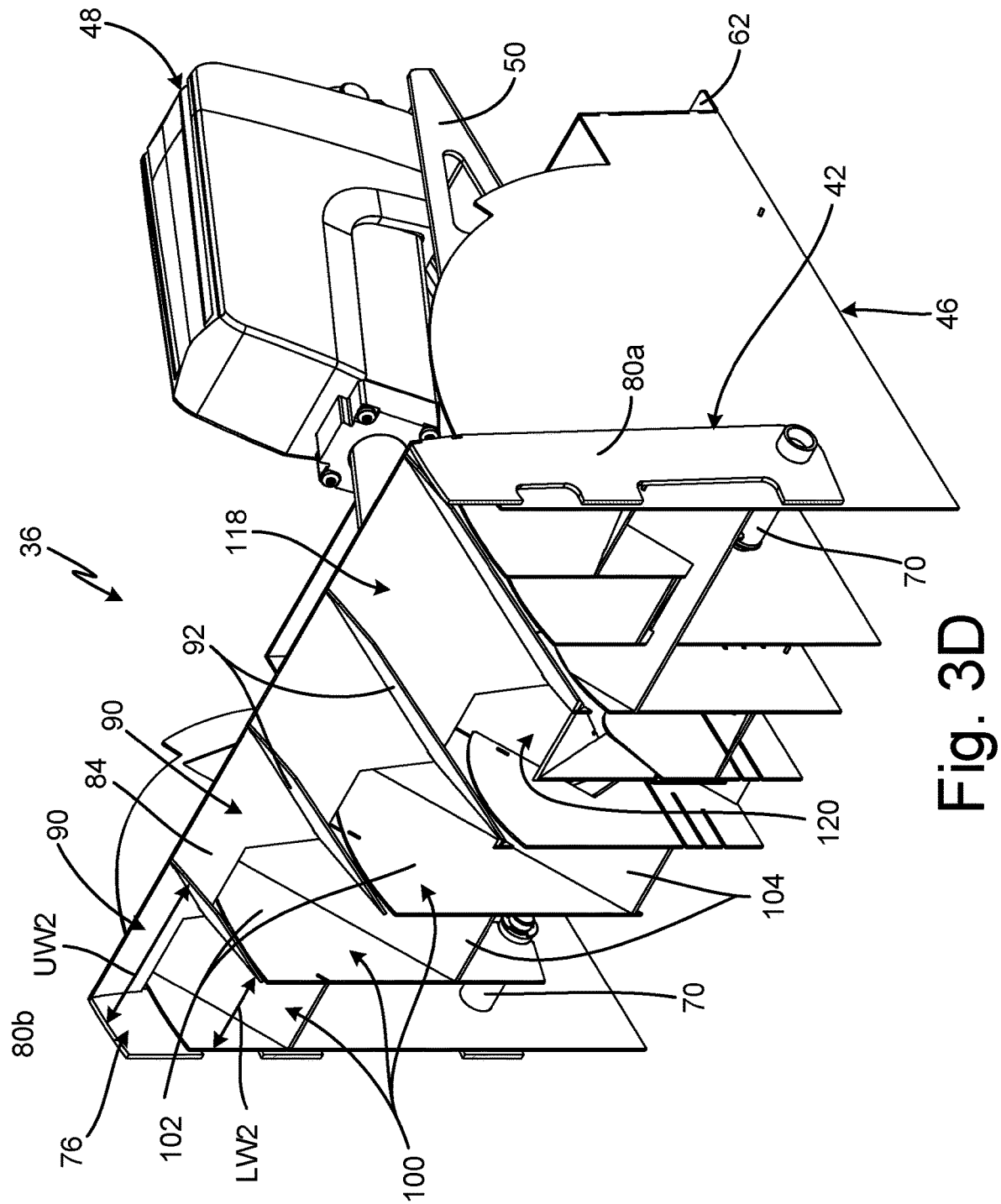
FIG. 3D is a cross-sectional view taken along line D-D in FIG. 3C.
Figure 3E:
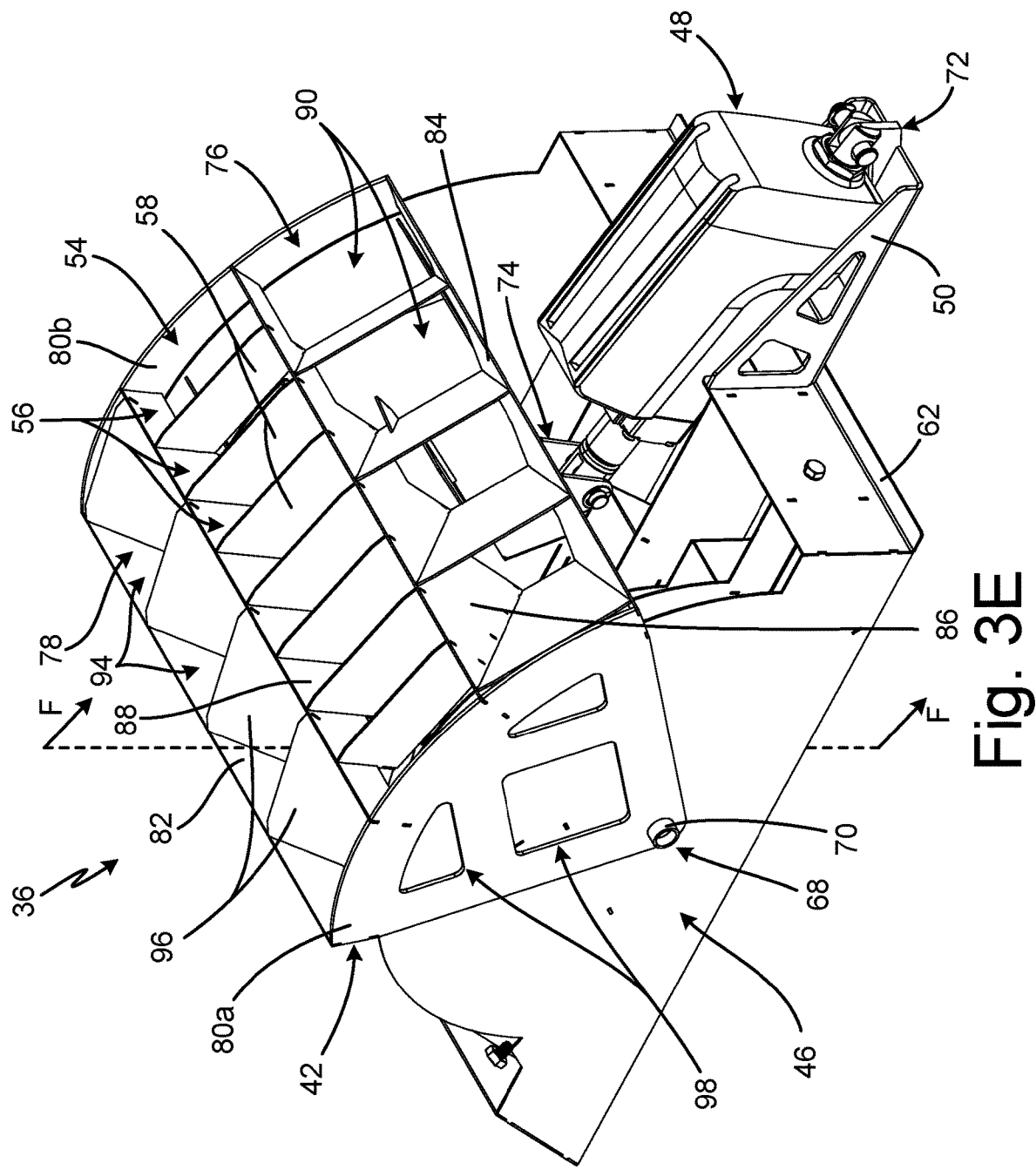
FIG. 3E is an isometric view of a sectional control funnel box with the funnel mechanism in a third position.
Figure 3F:
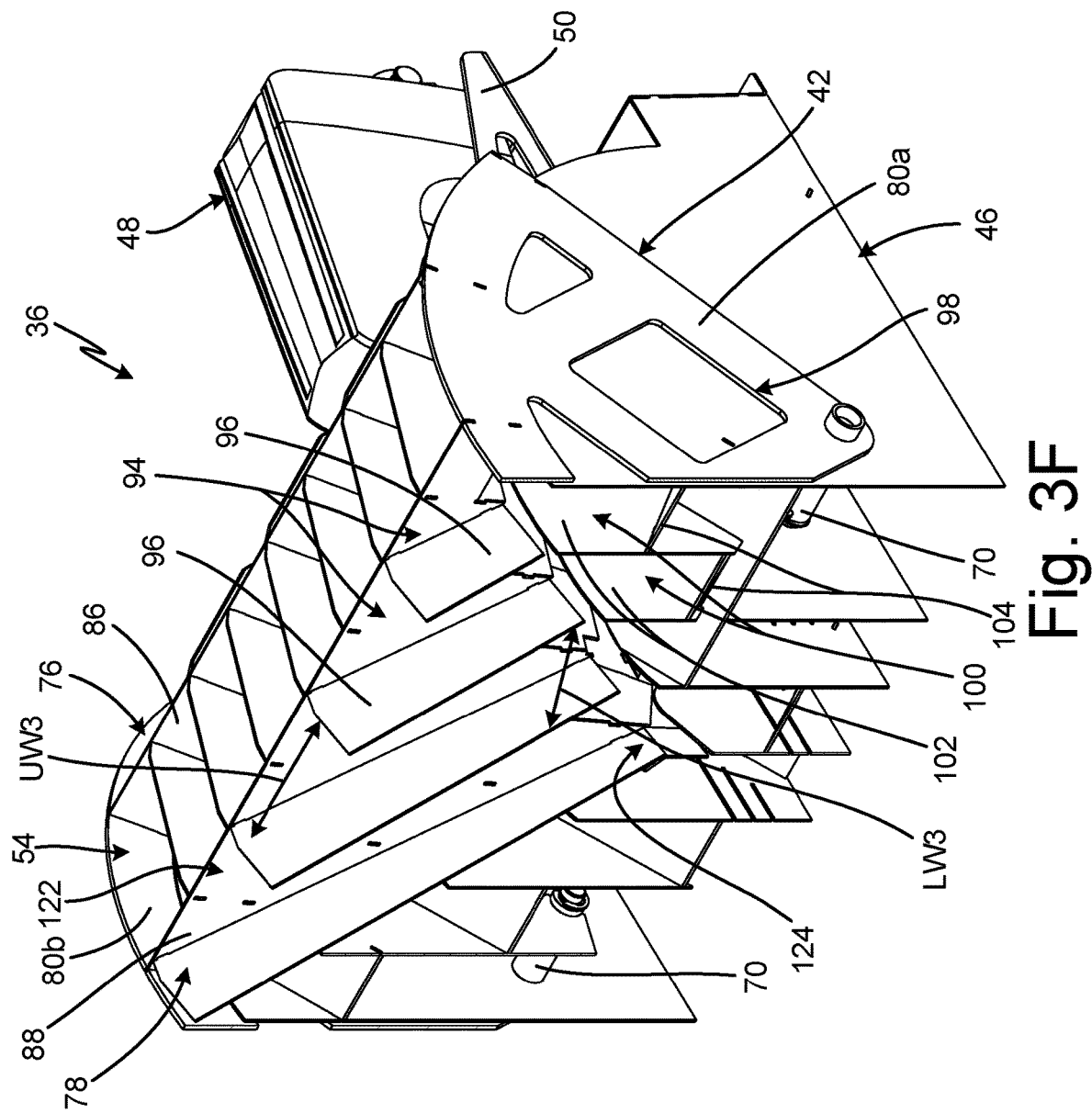
FIG. 3F is a cross-sectional view taken along line F-F in FIG. 3E.

FIG. 3A is an isometric view of sectional control funnel box 36 with cover 52 removed and funnel mechanism 42 in a first position. FIG. 3B is a cross-sectional view of sectional control funnel box 36 taken along line B-B in FIG. 3A. FIG. 3C is an isometric view of sectional control funnel box 36 with cover 52 removed and funnel mechanism 42 in a second position. FIG. 3D is a cross-sectional view of sectional control funnel box 36 taken along line D-D in FIG. 3C. FIG. 3E is an isometric view of sectional control funnel box 36 with cover 52 removed and funnel mechanism 42 in a third position. FIG. 3F is a cross-sectional view of sectional control funnel box 36 taken along line F-F in FIG. 3E. FIGS. 3A-3F will be discussed together.

Sectional control funnel box 36 includes funnel mechanism 42, lower manifold 46, actuator 48, support plate 50, pins 70, motor pivot 72, and arm pivot 74. Funnel mechanism 42 includes first supply section 54, second supply section 76, third supply section 78, side 80a, side 80b, front side 82, back side 84, first lateral divider 86, and second lateral divider 88. First supply section 54 includes first slots 56 defined between first dividers 58. Each first slot 56 has an upper width UW1 and a lower width LW1. Second supply section 76 includes second slots 90 defined between second dividers 92. Each second slot 90 has an upper width UW2 and a lower width LW2. Third supply section 78 includes third slots 94 defined between third dividers 96. Each third slot 94 has an upper width UW3 and a lower width LW3. Sides 80*a*, 80*b* include apertures 98. Rear flange 62 and chutes 100 of lower manifold 46 are shown. Chutes 100 are at least partially defined by manifold dividers 102 and include directing members 104. Actuator 48 includes actuator motor 64 and actuator arm 66. Motor pivot 72 includes flange 106, pivot member 108, and motor pin 110. Arm pivot 74 includes funnel bracket 112, end member 114, and arm pin 116.

Figure 5A:
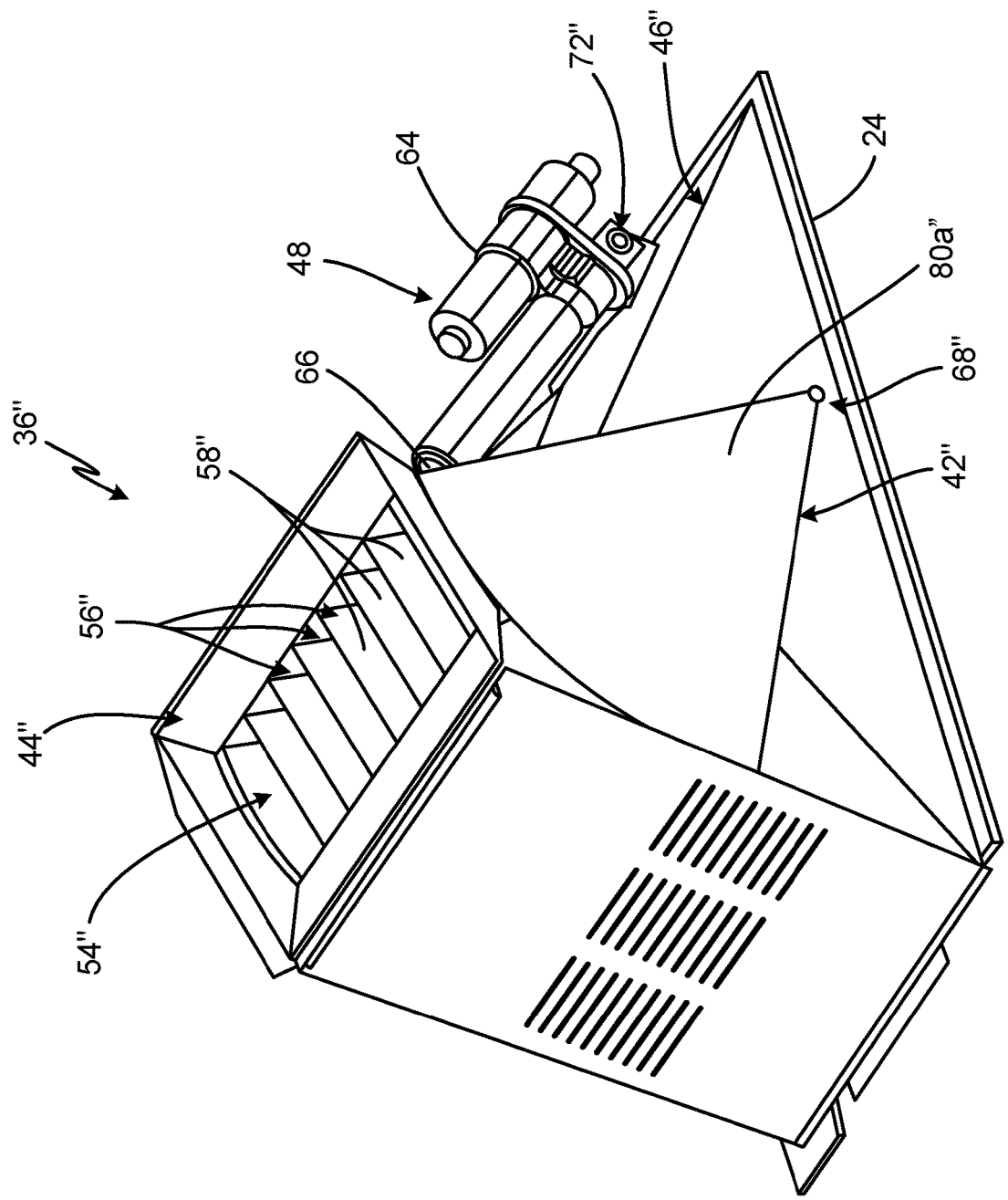
FIG. 5A is a first isometric view a sectional control funnel box with a funnel mechanism in a first position.
Figure 5B:
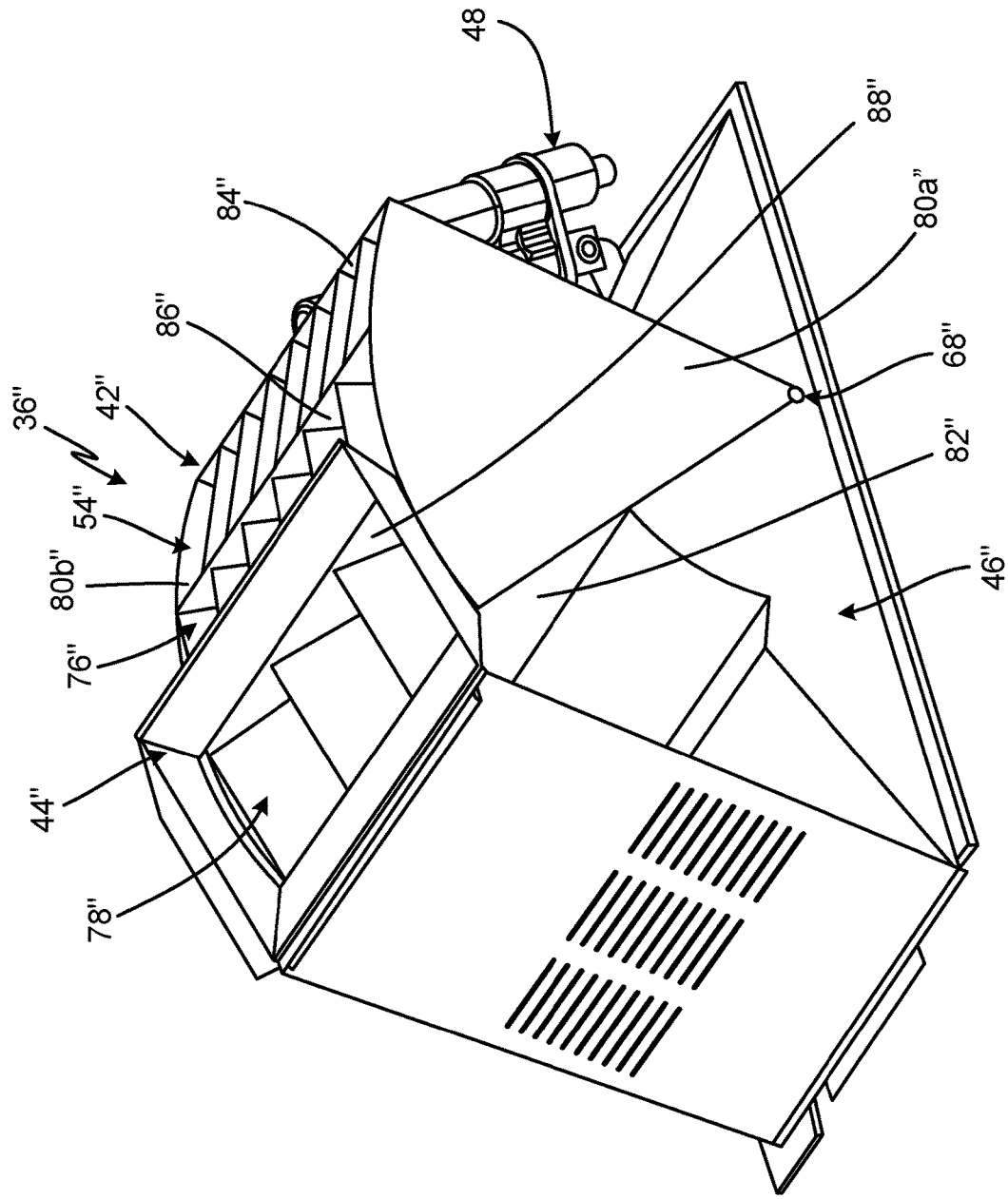
FIG. 5B is a second isometric view a sectional control funnel box.
Figure 5C:
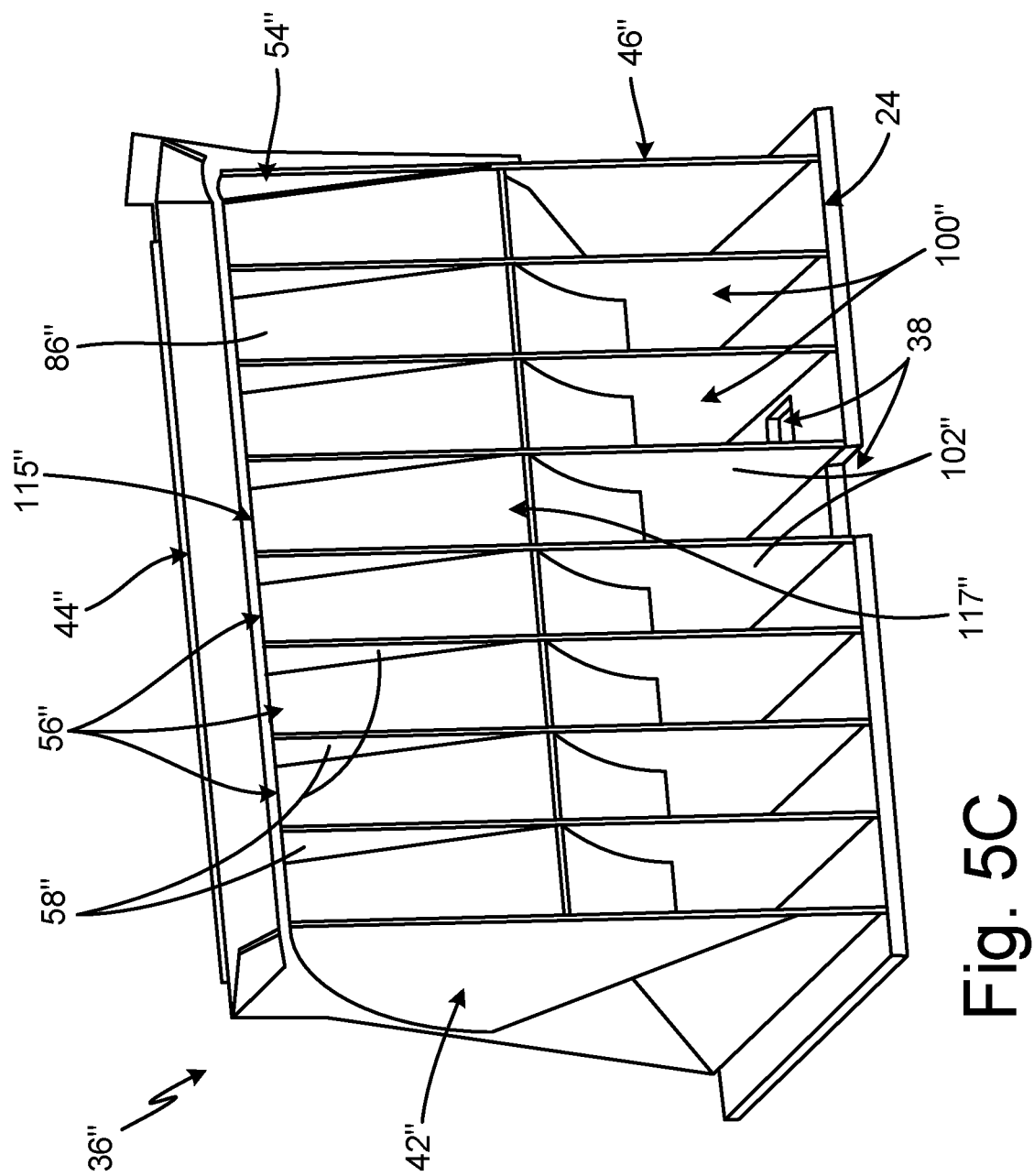
FIG. 5C is a cross-sectional view of a sectional control funnel box with the funnel mechanism in a first position.
Figure 5D:
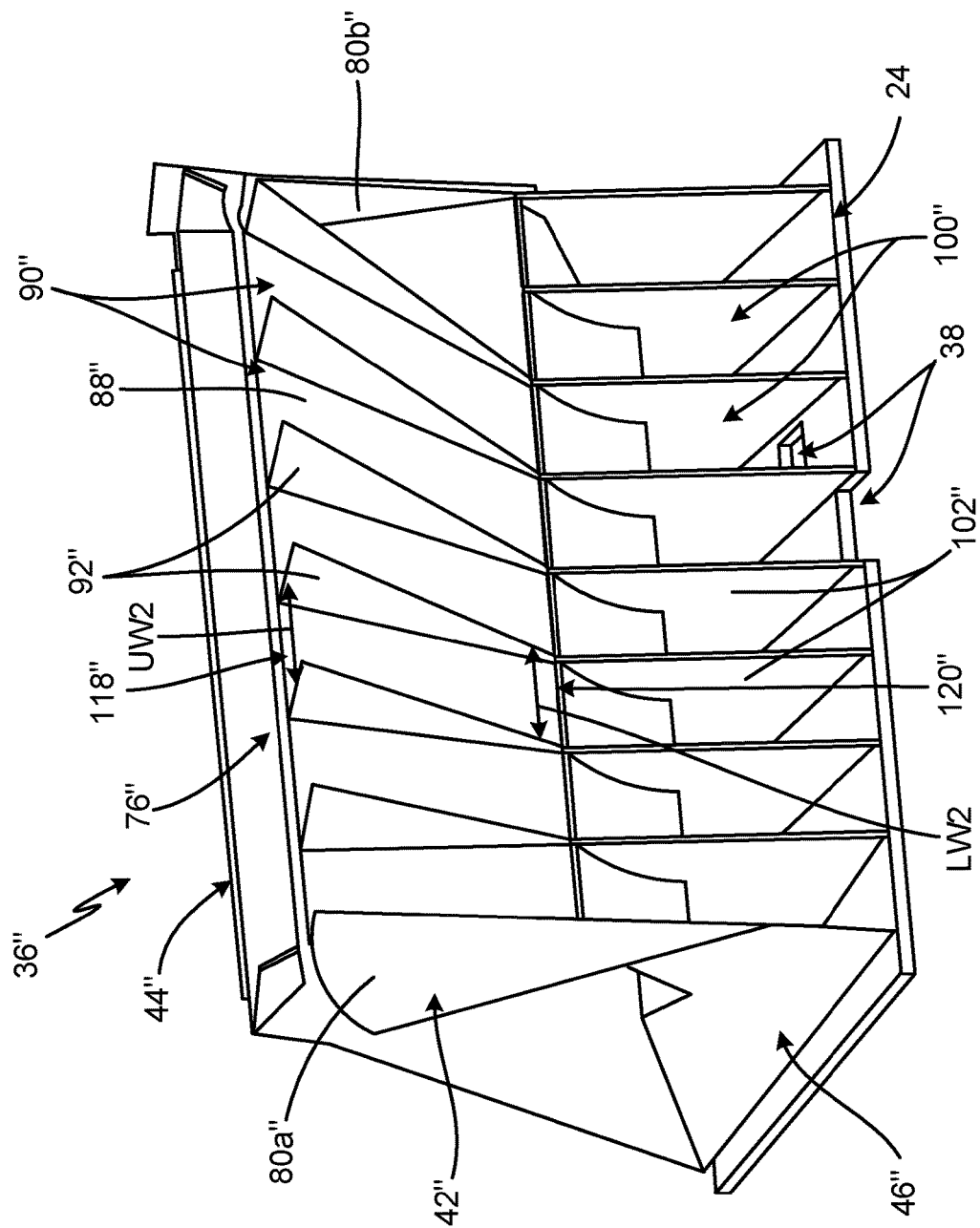
FIG. 5D is a cross-sectional view of a sectional control funnel box with the funnel mechanism in a second position.
Figure 5E:
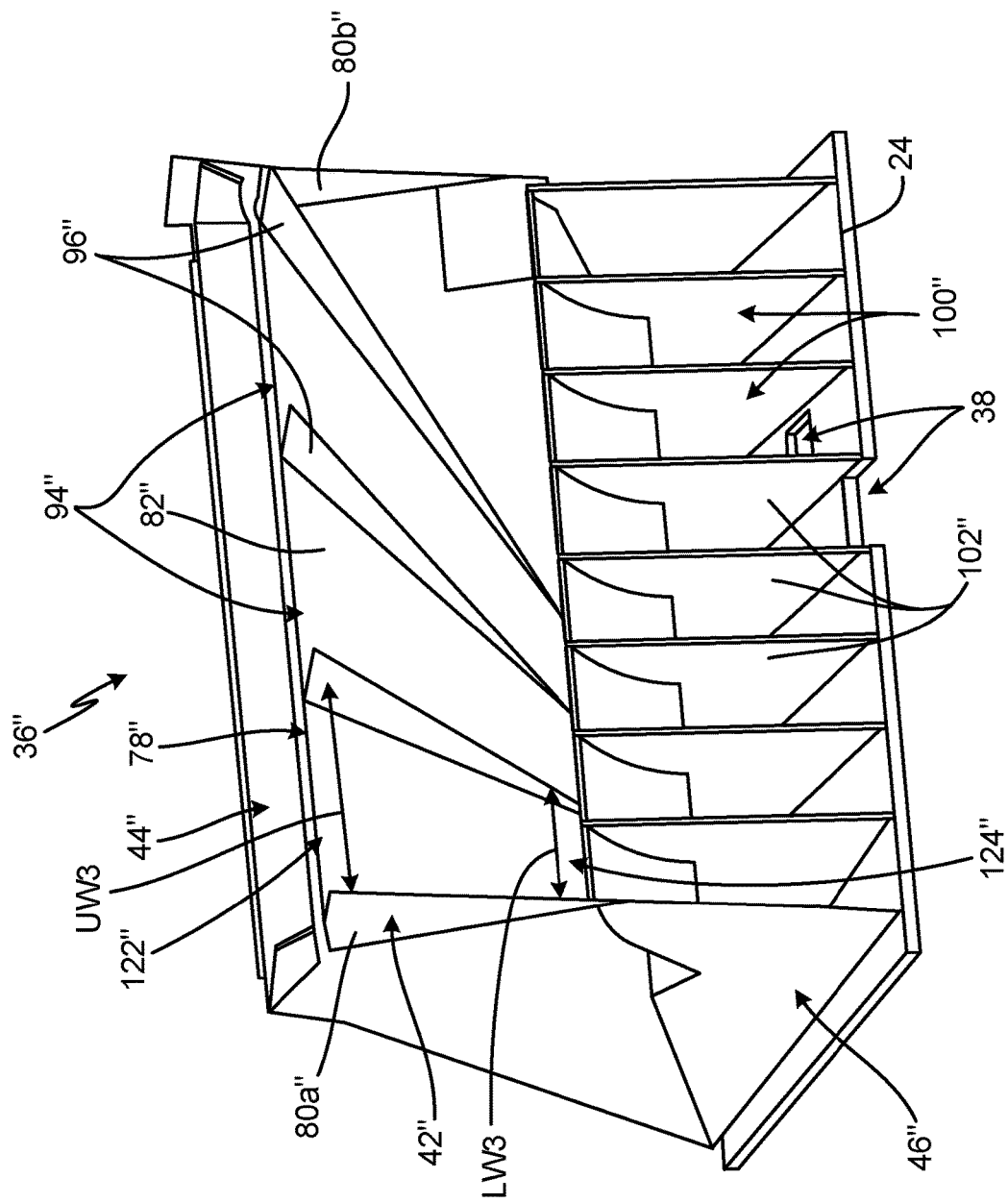
FIG. 5E is a cross-sectional view of a sectional control funnel box with the funnel mechanism in a third position.

Lower manifold 46 is mounted on a distribution plate, such as distribution plate 24 (best seen in FIGS. 5C-5E). Chutes 100 extend through lower manifold 46 and direct the flow of particulate material from funnel mechanism 42 to the individual apertures 38 through distribution plate 24. Manifold dividers 102 extend lengthwise through lower manifold 46 and separate adjacent chutes 100. Directing members 104 are disposed within chutes 100 between manifold dividers 102. Directing members 104 slant forward or backwards within lower manifold 46 and are configured to guide the flow of particulate material within chutes 100 towards apertures 38 in distribution plate 24.

Funnel mechanism 42 is mounted on lower manifold 46 and disposed within sectional control funnel box 36 below receiving portion 44 (best seen in FIGS. 2A-2B). Apertures 98 extend through sides 80*a*, 80*b* to reduce the weight of funnel mechanism 42. As such, less power is required to drive funnel mechanism 42 between the various positions. Pins 70 extend through side 80*a* and side 80*b* of funnel mechanism 42 and into lower manifold 46. Pins 70 support funnel mechanism 42 on lower manifold 46 and provide pivot points to facilitate movement of funnel mechanism 42 relative to lower manifold 46. While funnel mechanism 42 is shown as mounted on pins 70, it is understood that funnel mechanism 42 can be mounted in any manner suitable for transitioning funnel mechanism 42 between the various positions. For example, bushings can extend from lower manifold 46 to form pivot point 68, and funnel mechanism 42 can be mounted on the bushings. In another example, a rod can extend through lower manifold 46 and funnel mechanism 42 can be pivot on the rod. While funnel mechanism 42 is shown as pivotably mounted on lower manifold 46, it is understood that funnel mechanism 42 can be mounted on lower manifold 46 in any desired manner. For example, funnel mechanism 42 can be mounted to shift linearly between the various positions.

Support plate 50 is mounted on lower manifold 46 and extends from lower manifold 46. Support plate 50 can be mounted on lower manifold 46 in any desired manner, either removably, such as by fasteners, or permanently, such as by welding. Actuator 48 is supported by support plate 50 and configured to actuate funnel mechanism 42 between the various positions. Actuator motor 64 is secured to support plate 50 at motor pivot 72. As shown, motor pivot 72 is formed by flange 106 extending from support plate 50 and pivot member 108 projecting from actuator motor 64. Pivot member 108 defines a channel that receives flange 106. Pivot member 108 and flange 106 are connected by motor pin 110 extending through pivot member 108 and flange 106. Motor pivot 72 allows for relative movement between actuator 48 and support plate 50 as actuator 48 drives funnel mechanism 42 between the various positions. It is understood that motor pivot 72 can be of any suitable configuration for allowing relative movement between actuator 48 and support plate 50. For example, motor pivot 72 can be a linear displacement mechanism and/or pivot member 108 can be formed on support plate 50 and flange 106 can be formed on and/or extend from actuator motor 64.

Actuator arm 66 extends from actuator motor 64 and is mounted to funnel mechanism 42 at arm pivot 74. Arm pivot 74 is formed by funnel bracket 112 and end member 114 of actuator arm 66. End member 114 of actuator arm 66 extends into funnel bracket 112 and is secured to funnel bracket 112 by arm pin 116 extending through funnel bracket 112 and end member 114. Arm pivot 74 allows for relative movement between actuator 48 and funnel mechanism 42 as actuator 48 drives funnel mechanism 42 between the various positions. It is understood that arm pivot 74 can be of any suitable configuration for allowing relative movement between actuator 48 and funnel mechanism 42. For example, arm pivot 74 can be a linear displacement mechanism and/or funnel bracket 112 can be disposed at an end of actuator arm 66 and end member 114 can be formed on and/or extend from funnel mechanism 42.

Actuator 48 can be of any suitable configuration for shifting funnel mechanism 42 between the various positions and for holding funnel mechanism 42 in a desired position. Actuator motor 64 can be a hydraulic motor, a pneumatic motor, an electric motor, or any suitable motor for driving actuator arm 66. Actuator arm 66 can be of any suitable configuration for causing displacement of funnel mechanism 42. In one example, actuator arm 66 can be a piston and actuator motor 64 can be a linear drive configured to linearly displace actuator arm 66 to drive funnel mechanism 42. In other examples, actuator arm 66 can be a screw and actuator motor 64 can drive rotation of the screw to cause displacement of funnel mechanism 42. In examples where actuator arm 66 is a screw, arm pivot 74 can connect with actuator arm 66 at a swivel coupling, to allow for relative movement between actuator arm 66 and end member 114. Alternatively, end member 114 can include internal threading configured to mate with external threading on actuator arm 66, such that rotation of actuator arm 66 causes end member 114 to travel lengthwise along actuator arm 66.

First supply section 54, second supply section 76, and third supply section 78 extend through funnel mechanism 42 and are configured to guide the particulate material to select chutes 100 within lower manifold 46. First lateral divider 86 extends between side 80*a* and side 80*b* of funnel mechanism 42. First lateral divider 86 separates first supply section 54 and second supply section 76. Second supply section 76 is disposed between first lateral divider 86, back side 84, side 80*a*, and side 80*b*. Second lateral divider 88 also extends between side 80*a* and side 80*b* of funnel mechanism 42. Second lateral divider 88 separates first supply section 54 and third supply section 78. First supply section 54 is disposed between first lateral divider 86, second lateral divider 88, side 80*a*, and side 80*b*. Third supply section 78 is disposed between second lateral divider 88, front side 82, side 80*a*, and side 80*b*.

First slots 56, second slots 90, and third slots 94 extend through first supply section 54, second supply section 76, and third supply section 78, respectively, and are configured to guide the particulate material to the associated chutes 100 in lower manifold 46. First dividers 58 are disposed within first supply section 54 and divide first supply section 54 into first slots 56. First slots 56 extend between upper openings 115 and lower openings 117. Second dividers 92 are disposed within second supply section 76 and divide second supply section 76 into second slots 90. Second slots 90 extend between upper openings 118 and lower openings 120. Third dividers 96 are disposed within third supply section 78 and divide third supply section 78 into third slots 94. Third slots 94 extend between upper openings 122 and lower openings 124.

Each slot 56, 90, 94 within a supply section is associated with a single chute 100 within lower manifold 46, and each chute 100 is associated with a single aperture 38 through distribution plate 24. It is understood that slots 56, 90, 94 from different subsections can be associated with the same chute. As such, each slot is configured to provide the particulate material for application by a single dispense point 41 (FIGS. 1B and 1C) on boom 26 (FIG. 1C). It is understood, however, that each slot can be associated with any desired number of chutes 100 in lower manifold 46. For example, a single slot can be associated with two chutes 100, such that the slot provides particulate material for application at two dispense points 41.

Actuator 48 is configured to drive funnel mechanism 42 between the first position, the second position, and the third position to implement the desired sectional control. By shifting funnel mechanism 42 between the various positions, the user can control which chutes 100, and thus which dispense points 41, receive the particulate at any given time.

With funnel mechanism 42 in the first position (FIGS. 3A and 3B), first supply section 54 is disposed below receiving portion 44, such that first supply section 54 provides a flowpath for the particulate material between receiving portion 44 and lower manifold 46. First slots 56 guide the particulate material to chutes 100. As shown, first supply section 54 includes the same number of first slots 56 as there are chutes 100 and apertures 38. As such, first supply section 54 provides the particulate material to every aperture 38 in distribution plate 24. First supply section thus provides the particulate material for application across the full width of boom 26, as first supply section 54 provides the particulate material to all apertures 38 through distribution plate 24.

With funnel mechanism 42 in the second position (FIGS. 3C and 3D), second supply section 76 is disposed below receiving portion 44, such that second supply section 76 provides a flowpath for the particulate material to flow between receiving portion 44 and lower manifold 46. Second supply section 76 is configured to receive the particulate material across a full width of receiving portion 44. Second dividers 92 are angled in a first direction between upper openings 118 and lower openings 120 to guide the particulate material to chutes 100 associated with second supply section 76. Second dividers 92 can have variable lengths to guide the particulate to the desired chutes 100. The angled second dividers 92 provide an equal proportion of the particulate material to each chute 100 associated with second slots 90. Each second slot 90 includes upper opening 118 having width UW2 and lower opening 120 having width LW2. UW2 is preferably larger than LW2, which facilitates receiving the particulate material across the full width of receiving portion 44 and directing the particulate material to less than all chutes 100. Second dividers 92 provide a smooth transition between UW2 and LW2, thereby encouraging the flow of the particulate to chutes 100 and preventing particulate from becoming jammed within second slots 90.

Chutes 100 not associated with at least one second slot 90 do not receive the particulate material with funnel mechanism 42 in the second position. As such, shifting funnel mechanism 42 to the second position provides sectional control by stopping the flow of particulate material to chutes 100 not associated with second supply section 76, thereby preventing the particulate material from flowing to apertures 38 and dispense points 41 associated with the closed chutes 100.

With funnel mechanism 42 in the third position (FIGS. 3E and 3F), third supply section 78 is disposed below receiving portion 44, such that third supply section 78 provides the flowpath for the particulate material to flow between receiving portion 44 and lower manifold 46. The particulate material is supplied to lower manifold 46 through third slots 94. Third supply section 78 is configured to receive the particulate material across the full width of receiving portion 44. Third dividers 96 are angled in a second direction, opposite the direction of second dividers 92, between upper openings 122 and lower openings 124 to guide the particulate material to chutes 100 associated with third supply section 78. The angled third dividers 96 ensure that an equal portion of the particulate material is provided to each chute 100 associated with third supply section 78. Third dividers 96 can have variable lengths to guide the particulate to the desired chutes 100. Each third slot 94 includes upper opening 122 having width UW3 and lower opening 124 having width LW3. To receive the particulate material across the full width of receiving portion 44 and provide the particulate material to less than all chutes 100, UW3 is larger than LW3. Third dividers 96 provide a smooth transition between UW3 and LW3, thereby encouraging the flow of the particulate to chutes 100 and preventing particulate from becoming jammed within third slots 94.

Chutes 100 not associated with at least one third slot 94 do not receive the particulate material with funnel mechanism 42 in the third position. As such, shifting funnel mechanism 42 to the third position provides sectional control by stopping the flow of particulate material to chutes 100 not associated with third supply section 78, effectively blocking those chutes 100, while allowing particulate material to flow to chutes 100 and dispense points associated with third supply section 78. Blocking chutes 100 prevents particulate from flowing to those apertures 38 and dispense points 41 associated with the blocked chutes 100.

In the example shown, funnel mechanism 42 is configured to provide particulate material to the full width of boom 26 or to subsets of the dispense points spaced along boom 26. The subsets can include the outermost dispense points (located furthest laterally from floater 10) and the innermost dispense points (located closest laterally to floater 10). For example, first supply section 54 can be positioned below upper receiving portion 44 to receive the particulate when particulate is desired at all dispense points 41. Funnel mechanism 42 can be actuated to the second position such that second supply section 76 is positioned to receive the particulate when particulate is desired at the outer subset of dispense points 41. With funnel mechanism 42 in the second position, the particulate flows to the outer subset and is blocked from flowing to the inner subset. Funnel mechanism 42 can be actuated to the third position such that third supply section 78 is positioned to receive the particulate when particulate is desired at an inner subset. With funnel mechanism 42 in the third position, the particulate flows to the inner subset and is blocked from flowing to the outer subset.

While funnel mechanism 42 is shown as including three subsections, it is understood that funnel mechanism 42 can include two supply sections or more than three supply sections. More than three subsections provide greater sectional control. For example, funnel mechanism 42 can include fourth and/or fifth supply sections having any number of slots, such as two slots, configured to provide particulate to further subsets of the dispense points. The additional supply sections can include fewer slots than the second subsection and the third subsection, thereby providing greater precision as to the dispense points receiving particulate. In addition, the supply sections can be arranged in any desired manner. For example, while second supply section 76 is described as providing particulate to the outer subset of dispense points and third supply section 78 is described as providing particulate to the inner subset of dispense points, second supply section 76 can instead be associated with the inner subset and third supply section 78 can instead be associated with the outer subset.

In some examples, the speed of the conveyor, such as conveyor 20 (FIGS. 1A-1B), providing the particulate material to sectional control funnel box 36 is varied based on the position of funnel mechanism 42. The conveyor speed is reduced as funnel mechanism 42 is positioned to reduce the number of chutes 100 receiving particulate, and the conveyor speed is increased as funnel mechanism 42 shifts positions to increase the number of chutes 100 receiving particulate. For example, the speed of conveyor 20 can be reduced when funnel mechanism 42 is actuated from the first position to either of the second position and the third position. Varying the speed of conveyor 20 ensures an even spread of particulate regardless of the number of chutes 100 receiving particulate. It is understood that the speed of conveyor 20 can be automatically controlled by system controller 16 (FIGS. 1A and 6) and/or can be manually controlled by the operator.

During operation, sectional control funnel box 36 is mounted on floater 10 (FIG. 1A-1C) as the lower funnel box. For example, sectional control funnel box 36 can be mounted on a preexisting distribution plate 24 by clamps, such as overcenter clamps. Conveyors draw particulate from product bins and provide the particulate to sectional control funnel box 36. The particulate falls off of the conveyor and into upper receiving portion 44. Funnel mechanism 42 is actuated to a desired position based on the desired application rate and dispense locations in the area of the field that floater 10 is traversing. The speed of the conveyor can be varied based on the position of funnel mechanism 42. The operator and/or system controller 16 controls the position of funnel mechanism 42 to control which dispense points 41 apply particulate at any given time. Sectional control funnel box 36 provides significant benefits, such as preventing overapplication, increasing the efficiency of particulate application, and ensuring an even spread of particulate in the field.

Figure 4B:
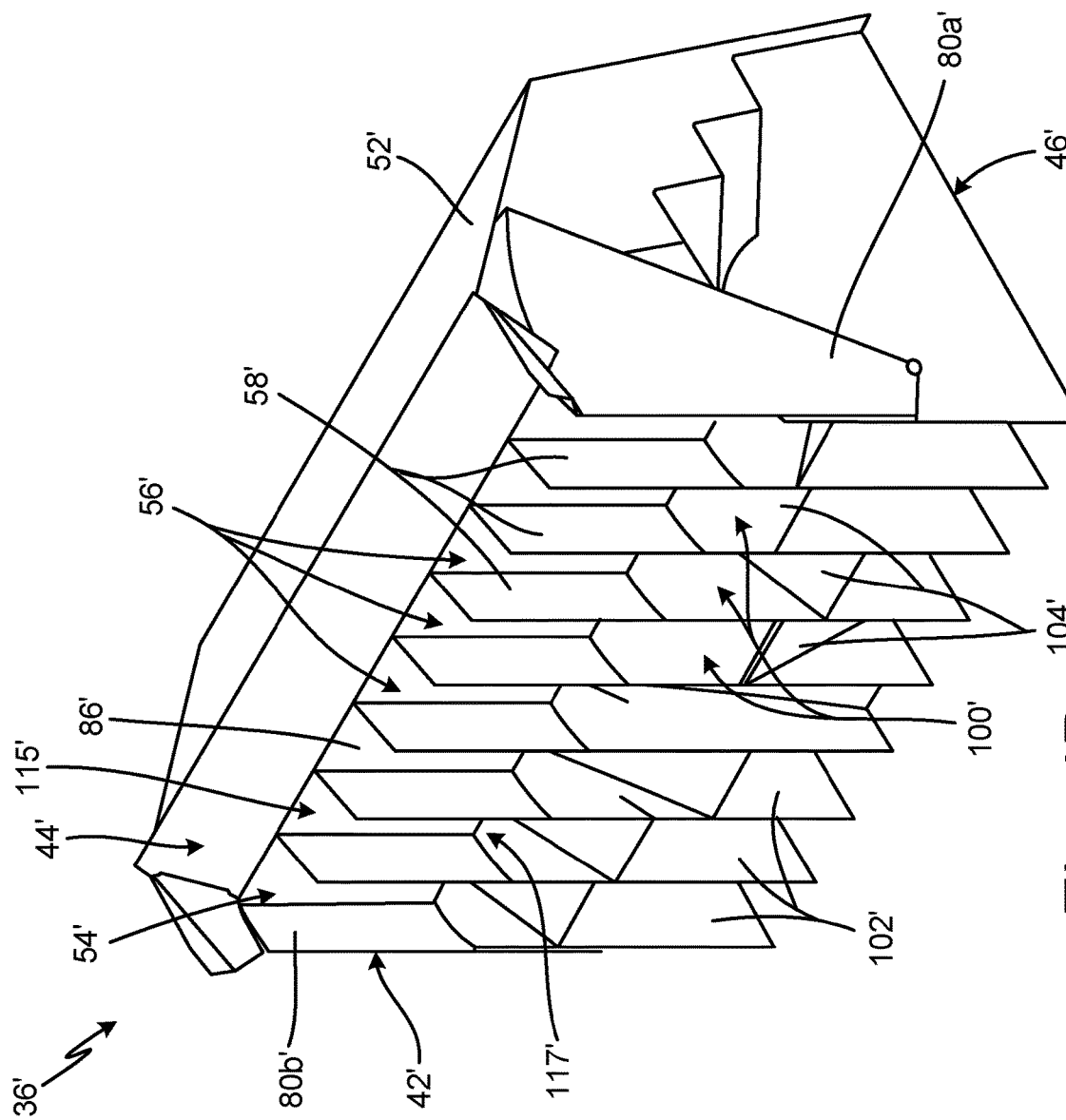
FIG. 4B is a cross-sectional view of the sectional control funnel box of FIG. 4A with the funnel mechanism in the first position.
Figure 4C:
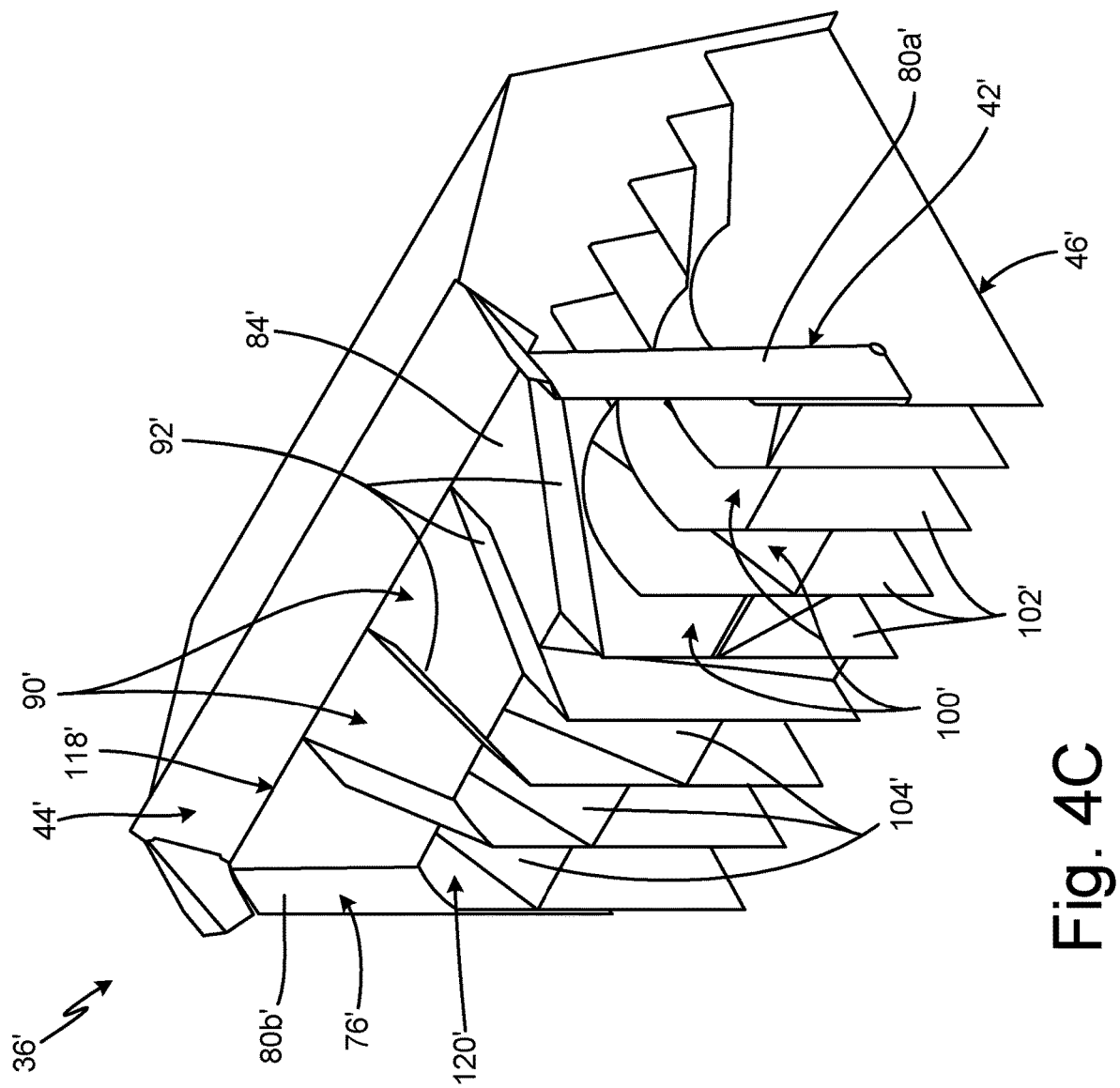
FIG. 4C is a cross-sectional view of the sectional control funnel box of FIG. 4A with the funnel mechanism in the second position.
Figure 4D:
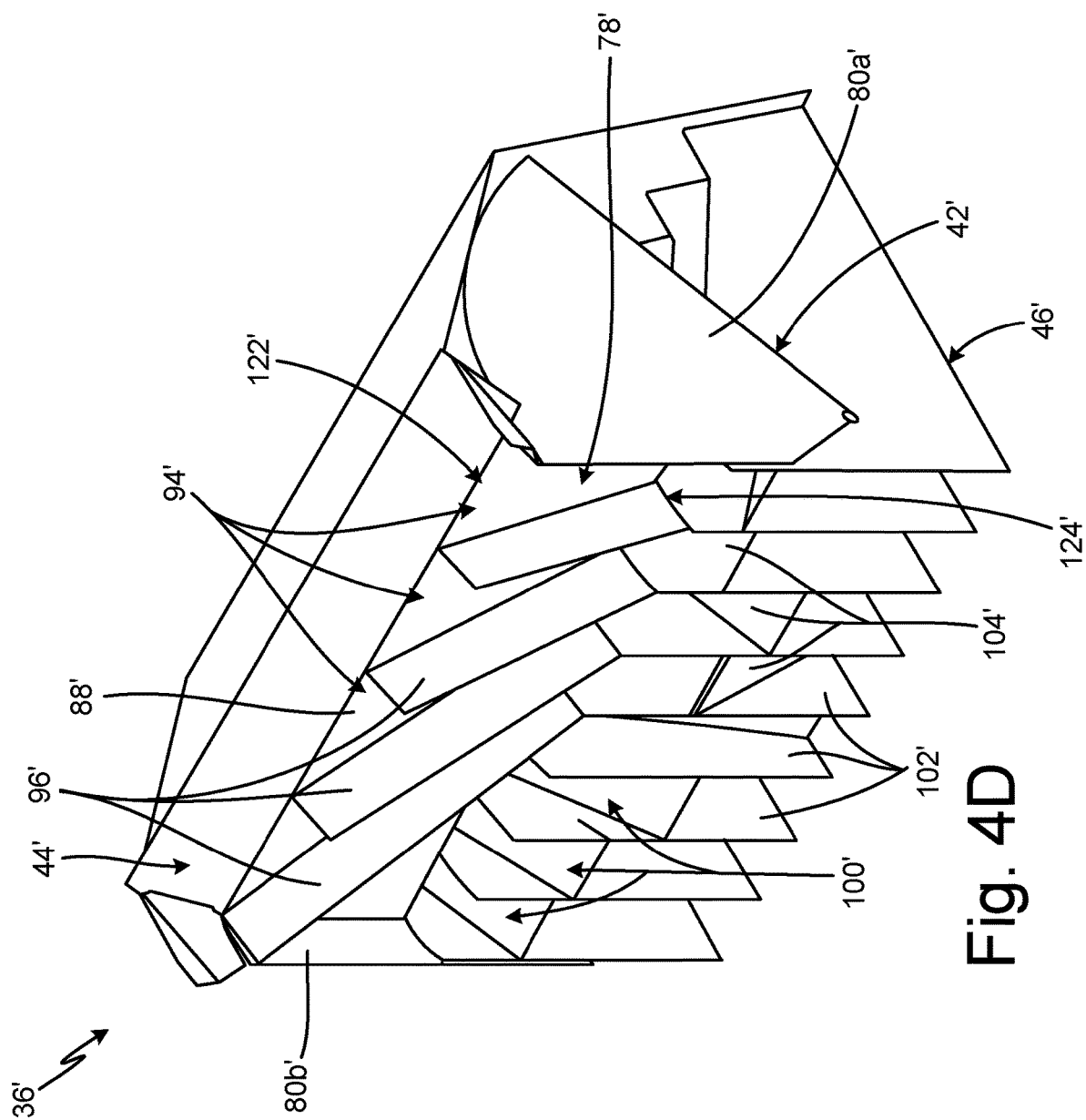
FIG. 4D is a cross-sectional view of the sectional control funnel box of FIG. 4A with the funnel mechanism in the third position.

FIG. 4A is an isometric view of sectional control funnel box 36'. FIG. 4B is a cross-sectional view of sectional control funnel box 36' showing funnel mechanism 44' in a first position. FIG. 4C is a cross-sectional view of sectional control funnel box 36' with funnel mechanism 42' in a second position. FIG. 4D is a cross-sectional view of sectional control funnel box 36' showing funnel mechanism 42' in the third position. FIGS. 4A-4D will be discussed together.

Funnel mechanism 42', upper receiving portion 44', lower manifold 46', and manifold cover 52' of sectional control funnel box 36' are shown. Funnel mechanism includes first supply section 54', second supply section 76', third supply section 78', side 80a', side 80b', back side 84', first lateral divider 86', and second lateral divider 88'. First supply section 54' includes first slots 56' defined between first dividers 58'. Second supply section 76' includes second slots 90' defined between second dividers 92'. Third supply section 78' includes third slots 94' defined between third dividers 96'. Lower manifold 46' includes chutes 100', which are at least partially defined by manifold dividers 102'. At least some chutes 100' further include directing members 104'.

Funnel mechanism 42' shown in FIGS. 4A-4D is substantially similar to funnel mechanism 42 shown in FIGS. 2A-3F. Manifold dividers 102' include a bulged portion between the front and rear ends of lower manifold 46'. The lower end of funnel mechanism 42' is curved to mate with bulged portion as funnel mechanism 42' is actuated between the various positions to ensure minimal spacing between funnel mechanism 42' and lower manifold 46', which prevents the particulate from migrating between chutes 100' as the particulate flows from funnel mechanism 42' into lower manifold 46'.

With funnel mechanism 42' in the first position (FIGS. 4A and 4B), first supply section 54' is disposed below upper receiving portion 44' to receive the particulate. First supply section 54' is similar to first supply section 54 (FIGS. 2A-3F) and first supply section 54" (FIGS. 5A-5E), in that first supply section 54' provides the particulate material to all chutes 100' extending through lower manifold 46'. As such, the particulate material is provided to all dispense points along the width of the boom with the funnel mechanism in the second position. First slots 56' guide the particulate between upper openings 115' and lower openings 117'. The particulate enters chutes 100' from lower openings 117'.

With funnel mechanism 42' is the second position (FIG. 4C), second supply section 76' is disposed below upper receiving portion 44' to receive the particulate. Second dividers 92' are angled between upper openings 118' and lower openings 120' such that second slots 90' provide the particulate material to a subset of chutes 100' extending through lower manifold 46'. Second dividers 92' can have variable lengths to direct the particulate to desired chutes 100'. In some examples, the subset of chutes 100' is associated with the distribution lines extending closest to the floater. In other examples, the first subset of chutes 100' is associated with the distribution lines extending furthest from the floater. As such, the second supply section 76' is configured to provide the particulate material to less than all of the dispense points, while preventing the particulate material from flowing to the dispense points not associated with second supply section 76'.

With funnel mechanism 42' in the third position (FIG. 4D), third supply section 78' is disposed below upper receiving portion 44' to receive particulate from upper receiving portion 44'. Third dividers 96' are angled opposite to second dividers 92' (FIG. 4C), such that third slots 94' provide the particulate material from upper openings 122' to lower openings 124' and to a second subset of the chutes 100' extending through lower manifold 46'. Third dividers 96' can have variable lengths to direct the particulate to desired chutes 100'. The second subset of chutes 100' is configured to provide the particulate material to the different dispense points than the first subset of chutes. In examples where the first subset of chutes is associated with the dispense points closest to the floater, the second subset of chutes can be associated with the dispense points furthest from the floater. In examples where the first subset of chutes is associated with the dispense points furthest from the floater, the second subset of chutes can be associated with the dispense points closest to the floater.

While second supply section 76' and third supply section 78' are described as providing the particulate material to less than all of chutes 100', and first supply section 54' is described as providing the particulate material to all chutes 100', it is understood that first supply section 54', second supply section 76', and third supply section 78' can be arranged in any desired order on funnel mechanism 42'. For example, second supply section 76' or third supply section 78' can be configured to provide the particulate material to all chutes 100', while first supply section 54' can be configured to provide the particulate material to a subset of chutes 100'.

Funnel mechanism 42' provides sectional control capabilities to sectional control funnel box 36'. The flow of particulate material can be provided across the full width of the boom mechanism with funnel mechanism 42' in the first position. Shifting funnel mechanism 42' to either of the second position or the third position will shift the particulate material distribution to either the outermost dispense points on the boom or the innermost dispense points on the boom. Funnel mechanism 42' prevents the particulate material from flowing to the other dispense points with the funnel mechanism in the second position or the third position. As such, sectional control funnel box 36' provides on/off or adjustable control of the flow of particulate material from the product bins to the distribution booms. Sectional control funnel box 36' prevents over-application in areas of a field that the floater has already traversed. Preventing over-application both saves material costs by eliminating waste of particulate material and provides environmental protection by controlling application near water features, such as ponds and streams.

FIG. 5A is a first isometric view of sectional control funnel box 36". FIG. 5B is a second isometric view of the sectional control funnel box 36". FIG. 5C is a cross-sectional view of the sectional control funnel box 36" with funnel mechanism 42" in a first position. FIG. 5D is a cross-sectional view of sectional control funnel box 36" with funnel mechanism 42" in a second position. FIG. 5E is a cross-sectional view of sectional control funnel box 36" with funnel mechanism 42" in a third position. FIGS. 5A-5E will be discussed together. Sectional control funnel box 36" includes funnel mechanism 42", upper receiving portion 44", lower manifold 46", and actuator 48. Funnel mechanism 42" includes first supply section 54", second supply section 76", third supply section 78", side 80a", side 80b", front side 82", back side 84", first lateral divider 86", and second lateral divider 88". First supply section 54" includes first slots 56" defined between first dividers 58". Second supply section 76" includes second slots 90" defined between second dividers 92". Third supply section 78" includes third slots 94" defined between third dividers 96". Lower manifold 46" includes chutes 100" and manifold dividers 102". Actuator 48 includes motor pivot 72". Sectional control funnel box 36" is mounted on distribution plate 24. Distribution plate 24 includes apertures 38.

Funnel mechanism 42" is similar to funnel mechanism 42 (FIGS. 2A-3F) and funnel mechanism 42' (FIGS. 4A-4D). Funnel mechanism 42" is mounted on lower manifold 46" and disposed within sectional control funnel box 36" below receiving portion 44". Funnel mechanism is configured to move between the first position shown in FIGS. 4A and 4C, the second position shown in FIG. 4D, and the third position shown in FIGS. 4B and 4E. As shown, funnel mechanism 42" is mounted to lower manifold 46" at pivot point 68" extending through lower manifold 46".

Lower manifold 46" is mounted on the distribution plate 24. Chutes 100" extend through lower manifold 46" and direct the flow of particulate material from funnel mechanism 42" to the individual apertures 38 through distribution plate 24. Manifold dividers 102" separate adjacent chutes 100". Actuator 48 is mounted on lower manifold 46" and is configured to drive funnel mechanism 42" between the first position, the second position, and the third position. Actuator 48 is mounted on lower manifold 46" such that actuator 48 can pivot relative to lower manifold 46" as funnel mechanism 42" transitions between the first position, the second position, and the third position. In the example shown, actuator motor 64 is attached to and configured to pivot on motor pivot 72". Motor pivot 72" provides a pivot point between actuator 48 and lower manifold 46". In some examples, a component of motor pivot 72" is formed on and/or extends from lower manifold 46". Actuator arm 66 extends from actuator motor 64 and is connected to back side 84" of funnel mechanism 42". Actuator arm 66 is connected to funnel mechanism 42" at another pivot point to account for relative movement between actuator arm 66 and funnel mechanism 42".

First supply section 54", second supply section 76", and third supply section 78" extend through funnel mechanism 42" and are configured to guide the particulate material to select chutes 100" within lower manifold 46". While funnel mechanism 42" is shown as including three supply sections, it is understood that funnel mechanism 42" can include as many or as few supply sections as desired. First lateral divider 86" extends between side 80a" and side 80b" of funnel mechanism 42". First lateral divider 86" separates first supply section 54" and second supply section 76". First supply section 54" is disposed between first lateral divider 86", back side 84", side 80a", and side 80b". Second lateral divider 88" also extends between side 80a" and side 80b" of funnel mechanism 42". Second lateral divider 88" separates second supply section 76" and third supply section 78". Second supply section 76" is disposed between first lateral divider 86", second lateral divider 88", side 80a", and side 80b". Third supply section 78" is disposed between second lateral divider 88", front side 82", side 80a", and side 80b".

First slots 56", second slots 90", and third slots 94" extend through first supply section 54", second supply section 76", and third supply section 78", respectively, and are configured to guide the particulate material to the associated chutes 100" in lower manifold 46". First dividers 58" are disposed within first supply section 54" and divide first supply section 54" into first slots 56". Second dividers 92" are disposed within second supply section 76" and divide second supply section 76" into second slots 90". Third dividers 96" are disposed within third supply section 78" and divide third supply section 78" into third slots 94".

With funnel mechanism 42" in the first position (FIGS. 5A and 5C), first supply section 54" is disposed below receiving portion 44", such that first supply section 54" provides a flowpath for the particulate material between receiving portion 44" and lower manifold 46". First slots 56" extend between upper openings 115" and lower openings 117" and guide the particulate material to chutes 100". As shown, first supply section 54" includes the same number of first slots 56" as chutes 100" and apertures 38", thereby providing the particulate material to all dispense points on the boom.

With funnel mechanism 42" in the second position (FIG. 4D), second supply section 76" is disposed below receiving portion 44" and provides a flowpath for the particulate material to flow between receiving portion 44" and lower manifold 46". Second supply section 76" is configured to receive the particulate material across a full width of receiving portion 44". Second dividers 92" are angled to guide the particulate material from upper openings 118" to lower openings 120" while reducing the width of second slots 90 between upper width UW2 and lower width LW2. Second dividers 92" can have variable lengths to direct the particulate to desired chutes 100". Second dividers 92" provide a smooth transition between UW2 and LW2, thereby encouraging the flow of the particulate to chutes 100" and preventing particulate from becoming jammed within second slots 90".

With funnel mechanism 42" in the third position (FIGS. 4B and 4E), third supply section 78" is disposed below receiving portion 44". Third supply section 78" is configured to receive the particulate material across the full width of receiving portion 44". Third dividers 96" are angled to guide the particulate material between upper openings 122" and lower openings 124" and to reduce the width of second slots 90" between upper width UW3 and lower width LW3. Third dividers 96" can have variable lengths to direct the particulate to desired chutes 100". Third dividers 96" provide a smooth transition between UW3 and LW3, thereby encouraging the flow of the particulate to chutes 100" and preventing particulate from becoming jammed within third slots 94".

In the example show, third supply section 78" is associated with fewer chutes 100" than second supply section 76". Funnel mechanism 42" thus includes fewer third slots 94" than second slots 90". Third supply section 78" provides further flow restriction of the particulate material as compared to second supply section 76" and first supply section 54". Funnel mechanism 42" can be configured to shut off flow to the dispense points 41 on boom 26 beginning from the outermost dispense points 41 (located furthest laterally from floater 10) towards the innermost dispense points 41. For example, first supply section 54" can be positioned to receive particulate when particulate is desired at all dispense points 41. Second supply section 76" can be positioned to receive particulate when particulate is desired at the subset of dispense points 41, shutting off flow to the outermost dispense points. Third supply section 78" can be positioned to receive particulate when particulate is desired at the innermost subset of dispense points, shutting off flow other dispense points. It is understood, however, that the supply sections can be arranged in any desired manner. For example, funnel mechanism 42" can be configured to shut off flow to dispense points 41 beginning from the innermost dispense points 41.

Sectional control funnel box 36" provides on/off or adjustable control of the flow of particulate material from the product bins to dispense points 41 along boom 26. Sectional control funnel box 36" prevents over-application in areas of a field that floater 10 has already traversed. Preventing over-application saves material costs by eliminating waste of particulate material. Sectional control funnel box 36" can also be retrofit onto an existing floater 10 by removing the existing lower funnel box and installing sectional control funnel box 36". Sectional control funnel box 36" can be connected to the operating unit of floater 10, such as to system controller 16, to allow for autonomous control of actuator 48 and thus autonomous control of the position of funnel mechanism 42". As such, sectional control funnel box 36" provides low cost, easily installed sectional control capabilities to floaters not previously equipped with sectional control capabilities.

Figure 6:
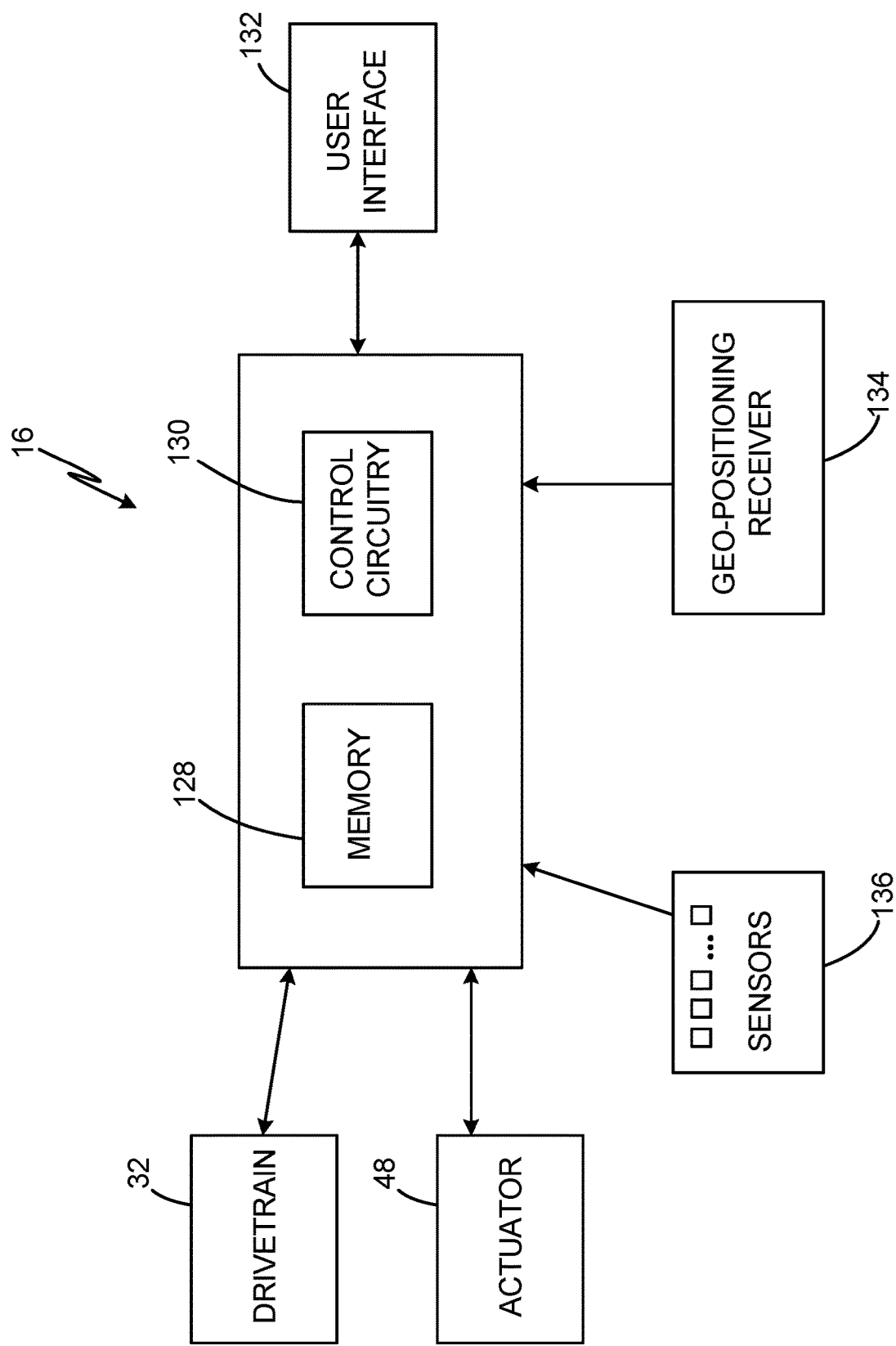
FIG. 6 is a block diagram of a control system.

FIG. 6 is a block diagram of system controller 16. System controller 16 includes memory 128, control circuitry 130, and user interface 132. System controller 16 is in communication with drivetrain 32, actuator 48, geo-positioning receiver 134, and sensors 136.

System controller 16 is configured to control the flow of particulate material to dispense points along boom 26 (FIG. 1C). System controller 16 is configured to control the operation of various components of floater 10 (FIGS. 1A-1D) to provide sectional control to floater 10. It is understood that system controller 16 can be of any suitable configuration for controlling operation of components of floater 10, gathering data, processing data, etc. In some examples, system controller 16 can be implemented as a plurality of discrete circuitry subassemblies. In one example, control circuitry 130 is configured to implement functionality and/or process instructions. For instance, control circuitry 130 can be capable of processing instructions stored in memory 128. Examples of control circuitry 130 can include any one or more of a microprocessor, a controller, a digital signal processor (DSP), an application specific integrated circuit (ASIC), a field-programmable gate array (FPGA), or other equivalent discrete or integrated logic circuitry.

Memory 128, in some examples, can be configured to store information during operation. Memory 128, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 128 is a temporary memory, meaning that a primary purpose of memory 128 is not long-term storage. Memory 128, in some examples, is described as volatile memory, meaning that memory 128 does not maintain stored contents when power is turned off. Examples of volatile memories can include random access memories (RAM), dynamic random access memories (DRAM), static random access memories (SRAM), and other forms of volatile memories. In some examples, memory 128 is used to store program instructions for execution by control circuitry 130. Memory 128, in one example, is used by software or applications running on system controller 16 to temporarily store information during program execution.

Memory 128, in some examples, also includes one or more non-volatile computer-readable storage media. Memory 128 can be configured to store larger amounts of information than volatile memory. Memory 128 can further be configured for long-term storage of information. In some examples, memory 128 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 132, such as a keyboard, touchscreen, monitor, mouse, smartphone, tablet, or other suitable interface device, allows a user to interact with system controller 16, such as by retrieving information from memory 128, receiving notifications, initiating the software stored in memory 128, and inputting additional information to memory 128, among other examples. User interface 132 can be integrated into system controller 16 or can be a device separate from system controller 16, such as a smartphone or tablet. In some examples, user interface 132 is a device integrated into and/or mounted within cab 12 of floater 10.

Sensors 136 are disposed at various locations on floater 10 and are configured to provide information to system controller 16. System controller 16 utilizes the information from sensors 136 to generate and provide commands to other components of floater 10. In some examples, sensors 136 can include sensors disposed at dispensing points along boom 26. Sensors 136 can be configured to provide information to system controller 16 regarding the flow of particulate material at the dispensing points. For example, sensors 136 can be acoustic sensors attached to the outside of deflectors located at the dispensing points. The acoustic sensors can communicate various parameters to system controller 16 and to the operator of the floater via user interface 132. For example, the sensors can indicate the quality of the lateral product distribution, indicate how much product has been distributed, and/or provide feedback for system controller 16 regarding product distribution. In other examples, sensors 136 can be a strain detecting sensor including, but not limited to, surface acoustic devices, piezoelectric strain sensors, BOTDR (Brillouin optical time-domain reflectometer) and other optical fiber strain sensors. In yet another example, sensors 136 can include ground speed sensors for providing the ground speed of the floater 10 and/or boom 26 to system controller 16.

Geo-positioning receiver 134, which can be compatible with any desired geo-positioning system, such as GPS, GNSS, and GPS/RTK, is communicatively connected to system controller 16. System controller 16 receives geo-positioning information from geo-positioning receiver 134 and can use that geo-positioning information to control the components of floater 10.

During operation, system controller 16 provides commands to actuator 48 and drivetrains 32 to implement the desired sectional control. The user can provide sectional control commands to system controller 16 via user interface 132, and in some examples the user can manually control actuator 48 and drivetrains 32 via user interface 132 and system controller 16. In other examples, system controller 16 is configured to automatically implement section control based on information received from sensors 136 and geo-positioning receiver 134.

The positions of the dispense points 41 along boom 26 can be determined and stored in memory 128. In addition, a field map can be generated and stored in memory 128. Based on information from sensors 136, system controller 16 can determine which dispense points 41 are dispensing particulate at any given time. As such, system controller 16 can determine which dispense points 41 are dispensing particulate at a given time and can determine the relative location of those dispense points 41 in the field. By comparing the dispense point information from sensors 136 with geo-positioning information received from geo-positioning receiver 134, system controller 16 can thus determine which areas of the field the particulate has been applied on. System controller 16 stores that treatment information in memory 128 and can utilize the treatment information to implement sectional control.

System controller 16 can determine and monitor the relative position of floater 10 and/or each dispense point within the field based on the information received from geo-positioning receiver 134. In some examples, system controller 16 can operate autonomously, such that system controller 16 implements sectional control based on the position of floater 10 and the portions of the field that have already been treated. In some examples, operator can provide sectional control commands to system controller 16 via user interface 132. System controller 16 can also provide information, such as geo-positioning and field map information, to the operator via user interface 132. The operator can also, in some examples, override the sectional control implemented by system controller 16 via the user interface 132.

System controller 16 can implement sectional control based on one or more baseline criteria, such as whether any particulate has already been applied to a portion of the field; whether a certain minimum amount of particulate has been applied to a portion of the field; soil chemistry in various areas of the field; and the relative location of other features in the field, such as ponds; among other options. For example, the baseline criteria can be that no additional particulate should be applied in areas of the field where any amount of particulate has already been applied.

When system controller 16 determines that floater is approaching an area of the field that meets the baseline criteria, system controller 16 will generate and send commands that cause actuator 48 to shift the funnel mechanism, such as funnel mechanism 42 (FIGS. 2A-3F) funnel mechanism 42' (FIGS. 4A-4D), and funnel mechanism 42" (FIGS. 5A-5E), to a desired position. System controller 16 can provide a sectional control command to actuator 48 to cause actuator 48 to shift funnel mechanism 42 between the various positions. With funnel mechanism 42 in the desired position, the particulate material is directed to those dispense points 41 associated with the slots extending through funnel mechanism 42. Funnel mechanism 42 prevents the particulate material from flowing to those dispense points not associated with the slots positioned to receive the particulate material. As such, the particulate will not be applied through those dispense points.

System controller 16 also sends a speed command to drivetrain 32 to set the speed of conveyor 20. Reducing the speed of conveyor 20 reduces the volume of particulate entering the sectional control funnel box. The volume of particulate entering sectional control funnel box 36 is reduced as the number of slots receiving particulate decreases because there are fewer dispense points receiving particulate from sectional control funnel box 36. As such, less particulate is required to maintain an even distribution at the dispense points still receiving particulate. Decreasing the speed of conveyor 20 thereby ensures even distribution of the particulate in the field. The speed command causes drivetrain 32 to increase the speed of conveyor 20 to increase the volume of particulate entering sectional control funnel box 36 when funnel mechanism 42 is actuated to a position having an increased number of slots receiving the particulate.

When system controller 16 determines that particulate flow should resume to the blocked dispense points or should be directed to different dispense points, system controller 16 sends a command to actuator 48 to cause funnel mechanism 42 to shift to the newly desired position. System controller 16 also sends a command to drivetrain 32 to cause drivetrain 32 to increase, decrease, or maintain the speed of conveyor 20, as required based on the new position of funnel mechanism 42.

System controller 16 provides significant advantages. System controller 16 the flow of particulate to dispensing points through sectional control funnel box 36. As such, system controller 16 accounts for asymmetrical field features and the typical working width of fertilizer spreaders and prevents overlap and duplicative application. System controller 16 can also reduce application rates near certain features, such as wetlands and open water, to thereby prevent water contamination and avoid applying particulate on wetlands or other protected area. System controller 16 thereby increases the efficiency of application while reducing material waste and thus cost.

Sectional funnel box 36 can be controlled automatically or by the operator, based on visual observation, or based on location data received from GPS, GNSS, GPS/RTK or equivalent systems presented as precision field maps and prescription maps, that is displayed to the operator on a mobile device inside the cab of the machine. Alternatively, or additionally, a fully automated, geo-referenced system controller 16 can activate funnel mechanism 42 and control conveyor speed. The smart-tracking automatic fertilization may be overridden by the operator taking manual control of to control which sections distribute fertilizer.

FIG. 7 is a flowchart illustrating method 138 of providing sectional control. In step 140, a system controller, such as system controller 16 (FIG. 6), is activated and the system controller determines the areas of the field on which particulate has been applied based on geo-positioning and dispense information. The system controller 16 can determine the location of the boom and dispense points relative to portions of the field on which the particulate material has already been applied, such as via GPS, GNSS, and/or GPS/RTK, for example.

In step 142, the system controller 16 generates and provides sectional control commands to mechanisms on floater 10. For example, system controller 16 can command actuator 48 (best seen in FIGS. 3A, 3C, and 3E) to shift a position of a funnel mechanism between various positions. The commands are generated by system controller 16 based on the relative location of the floater 10 in the field. System controller 16 can also control the speed of conveyors 20 (FIGS. 1A-1C) to adjust the actual application rate at each dispense point.

In step 144, the actuator shifts the funnel mechanism to the desired position based on the command received from system controller 16. Sensors, such as sensors 136 (FIG. 5), provide feedback to the operator and system controller 16 regarding the flow of particulate material to the various dispense points along boom 26. System controller 16 can cause actuator 48 to adjust the position of the funnel mechanism based on the locations of the dispense points relative to already treated portions of the field as the floater traverses the field and/or based on any other criteria desired by the operator. As such, the system controller 16 controls the flow of particulate material to the boom via the sectional control funnel box. System controller 16 can cause actuator 48 to continuously adjust the position of the funnel mechanism based on changing features in the field as the floater traverses the field.

Sectional control funnel box 36 allows the operator of a floater to control the flow of particulate material to the boom for application to the field. Controlling the flow of particulate material prevents over-application of the particulate material within the field. Controlling the flow of particulate material prevents reapplication of the particulate material in areas where the particulate material has already been applied, thereby preventing harm due to over application and providing a savings in both costs and materials.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sectional control funnel box comprising:
   a manifold including a plurality of chutes extending through the manifold;
   a funnel mechanism mounted to the manifold at a pivot point and pivotally movable about the pivot point relative to the manifold, the funnel mechanism including a plurality of supply sections configured to direct material from an upper receiving opening to select ones of the plurality of chutes; and
   an actuator connected to the funnel mechanism and configured to drive the funnel mechanism between a first position, where a first one of the plurality of supply sections is aligned with the upper receiving opening, and a second position, where a second one of the plurality of supply sections is aligned with the upper receiving opening.

2. The sectional control funnel box of claim 1, wherein the first one of the plurality of supply sections includes a first slot configured to direct the material, and the second one of the plurality of supply sections includes a second slot configured to direct the material.

3. The sectional control funnel box of claim 2, wherein the first slot includes an upper opening and a lower opening, and wherein a width of the upper opening is larger than a width of the lower opening.

4. The sectional control funnel box of claim 2, wherein: the funnel mechanism includes:
   a front wall;
   a back wall;
   a first side wall extending between the front wall and the back wall; a second side wall extending between the front wall and the back wall; and
   a first lateral wall extending between the first side wall and the second side wall and disposed between the front wall and the back wall; and
   the first lateral wall separates the first supply section from the second supply section.

5. The sectional control funnel box of claim 4, further comprising:
   a slanted wall disposed in the first supply section and projecting from the first lateral wall, the slanted wall at least partially defining the first slot.

6. The sectional control funnel box of claim 2, wherein:
   the first one of the plurality of supply sections includes a first plurality of slots;
   the second one of the plurality of supply sections includes a second plurality of slots; and
   a third one of the plurality of supply sections includes a third plurality of slots.

7. The sectional control funnel box of claim 6, wherein:
   the first plurality of slots is configured to direct the material to a first subsection of the plurality of chutes;
   the second plurality of slots is configured to direct the material to a second subsection of the plurality of chutes, the second subsection being different than the first subsection; and
   the third plurality of slots is configured to direct the material to each of the first subsection of the plurality of chutes and the second subsection of the plurality of chutes.

8. The sectional control funnel box of claim 1, wherein the actuator comprises:
   a motor supported by the manifold; and an arm extending from the motor and connected to the funnel mechanism;

wherein the motor is configured to displace the arm to drive the funnel box between the first position and the second position.

9. The sectional control funnel box of claim 8, further comprising:

a support plate extending from the manifold;

wherein the motor is mounted on the support plate.

10. The sectional control funnel box of claim 9, wherein the motor is mounted to the support plate at a first actuator pivot point, and the arm is connected to the funnel mechanism at a second actuator pivot point.

11. The sectional control funnel box of claim 1, further comprising:

control circuitry configured to:

output a position command to the actuator, thereby causing the actuator to shift a position of the funnel mechanism.

12. A sectional control system comprising:

a product bin disposed on an agricultural spreader and configured to store particulate material;

a boom extending laterally from the agricultural spreader;

a first dispensing line and a second dispensing line extending along the boom, the first dispensing line providing the particulate material to a first dispensing point and the second dispensing line providing the particulate material to a second dispensing point;

a conveyor configured to draw material from the product bin;

a sectional control funnel box mounted to receive the material from the conveyor, the sectional control funnel box comprising:

an upper receiving opening positioned to receive the material from the conveyor;

a manifold disposed below the upper receiving opening and including a plurality of chutes extending through the manifold;

a funnel mechanism disposed between the upper receiving opening and the manifold, wherein the funnel mechanism is mounted to the manifold at a pivot point and pivotally movable about the pivot point relative to the manifold, and the funnel mechanism includes a plurality of supply sections configured to direct material from the upper receiving opening to select ones of the plurality of chutes; and an actuator connected to the funnel mechanism and configured to drive the funnel mechanism between a first position, in which a first one of the plurality of supply sections is aligned with the upper receiving opening, and a second position, in which a second one of the plurality of supply sections is aligned with the upper receiving opening.

13. The sectional control system of claim 12, further comprising:

control circuitry configured to:

determine relative positions of the first dispense point and the second dispense point relative to treated portions of a field; and output a position command to the actuator based on the relative positions, the position command causing the actuator to shift a position of the funnel mechanism.

14. The sectional control system of claim 13, further comprising:

a geo-positioning receiver configured to receive geo-position data;

wherein the control circuitry is configured to generate the position command based on the geo-position data.

15. The sectional control system of claim 12, wherein the first one of the plurality of supply sections includes a first slot configured to direct the material, and the second one of the plurality of supply sections includes a second slot configured to direct the material.

16. The sectional control system of claim 15, wherein the first supply section is configured to direct the material to a first chute of the plurality of chutes and to block the material from a second chute of the plurality of chutes, and the second supply section is configured to direct the material to the second chute of the plurality of chutes and to block the material from the first chute of the plurality of chutes.

17. The sectional control system of claim 15, wherein the first supply section is configured to direct the material to a first chute of the plurality of chutes and a second chute of the plurality of chutes.

18. A method of agricultural section control, the method comprising:

determining a location of a spreader machine in a field relative to treated portions of the field, the spreader machine comprising a sectional control funnel box having:

a manifold including a plurality of chutes extending through the manifold;

a funnel mechanism mounted to the manifold at a pivot point and pivotally movable about the pivot point relative to the manifold, the funnel mechanism including a plurality of supply sections configured to direct material from an upper receiving opening to select ones of the plurality of chutes; and an actuator connected to the funnel mechanism and configured to drive the funnel mechanism between a first position, where a first one of the plurality of supply sections is aligned with the upper receiving opening, and a second position, where a second one of the plurality of supply sections is aligned with the upper receiving opening;

generating a section control command based on the determined location of the spreader machine and providing the section control command to the actuator;

using the actuator to pivot the funnel mechanism relative to the manifold to move the funnel mechanism to a desired position based on the section control command; and directing, by the funnel mechanism, the material to select dispense lines extending laterally from the spreader machine along a boom of the spreader machine.

19. The method of claim 18, wherein the step of directing, by the funnel mechanism, the material to select dispense lines extending laterally from the spreader machine along a boom of the spreader machine comprises:

directing, by the funnel mechanism, the material to select chutes extending through a manifold on which the funnel mechanism is mounted, wherein the chutes direct the material to the dispense lines.

* * * * *